United States Patent
Wang et al.

(10) Patent No.: US 12,398,222 B2
(45) Date of Patent: Aug. 26, 2025

(54) FLAME-RETARDANT ANTIMICROBIAL AGENT, PREPARATION METHOD THEREFOR AND USE THEREOF, AND FLAME-RETARDANT ANTIMICROBIAL THERMOPLASTIC RESIN COMPOSITION

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Yutao Wang, Beijing (CN); Liqiu Chu, Beijing (CN); Jie Li, Beijing (CN); Shijun Zhang, Beijing (CN); Dali Gao, Beijing (CN); Hua Yin, Beijing (CN); Peng Guo, Beijing (CN); Jingbo Shao, Beijing (CN); Changjin Li, Beijing (CN); Chenxi Hu, Beijing (CN); Yiqing Bai, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 715 days.

(21) Appl. No.: 17/755,537

(22) PCT Filed: Oct. 29, 2020

(86) PCT No.: PCT/CN2020/124805
§ 371 (c)(1),
(2) Date: Apr. 30, 2022

(87) PCT Pub. No.: WO2021/083272
PCT Pub. Date: May 6, 2021

(65) Prior Publication Data
US 2022/0380492 A1    Dec. 1, 2022

(30) Foreign Application Priority Data
Oct. 30, 2019 (CN) .................. 201911042238.X

(51) Int. Cl.
C08F 8/32     (2006.01)
C08F 2/44     (2006.01)
C08F 4/04     (2006.01)
C08F 222/08   (2006.01)
B82Y 30/00    (2011.01)

(52) U.S. Cl.
CPC ............. *C08F 8/32* (2013.01); *C08F 2/44* (2013.01); *C08F 222/08* (2013.01); *B82Y 30/00* (2013.01); *C08F 2810/20* (2013.01)

(58) Field of Classification Search
CPC .. C08F 8/32; C08F 2/44; C08F 222/08; C08F 4/04
See application file for complete search history.

(56) References Cited

U.S. PATENT DOCUMENTS

| | | |
|---|---|---|
| 2004/0259987 A1 | 12/2004 | Zubkova et al. |
| 2007/0190876 A1 | 8/2007 | Ogawa et al. |
| 2007/0202770 A1 | 8/2007 | Penalva |
| 2015/0045496 A1 | 2/2015 | Jasra et al. |
| 2019/0022903 A1 | 1/2019 | Kito et al. |
| 2019/0085154 A1 | 3/2019 | Jiang et al. |

FOREIGN PATENT DOCUMENTS

| | | |
|---|---|---|
| CN | 101628952 A | 1/2010 |
| CN | 101724284 A | 6/2010 |
| CN | 103554595 A | 2/2014 |
| CN | 103937003 A | 7/2014 |
| CN | 104119474 B | 6/2016 |
| CN | 103554325 B | 7/2016 |
| CN | 105754278 A | 7/2016 |
| CN | 106149091 A | 11/2016 |

(Continued)

OTHER PUBLICATIONS

Sun, Xiaoxiao et al.; "Guanidine-based polymeric microspheres with a nonleaching, antibacterial performance"; Journal of Applied Polymer Science; vol. 134, No. 28; Jul. 28, 2017; No. 44821 (pp. 1-9).
Xu, Yihui et al.; "Preparation and performance of polyolefin elastomer blends mixed by different compatilizers"; China Synthetic Resin and Plastics; vol. 35, No. 5; 2018; pp. 1-4.
Bao, Fangjian et al.; "Precipitation copolymerization of maleic anhydride and mixed C4 hydrocarbons"; Petrochemical Technology; vol. 46, No. 5; 2017; pp. 564-571.
Wang, Xu et al.; "Antibacterial activities and mechanisms of fluorinated graphene and guanidine-modified graphene"; The Rolyal Society of Chemistry; vol. 6; 2016; pp. 8763-8772.
Taibao, Yu et al., "A Novel Guanidine Agent of Polymeric Antimicrobial Agent Preparation and Characterization of Antibacterial Properties", Guangdong Chemical Industry, vol. 40, No. 260, Sep. 18, 2013, pp. 56-57.

(Continued)

*Primary Examiner* — Catherine S Branch
(74) *Attorney, Agent, or Firm* — NKL Law; Allen Xue

(57) ABSTRACT

A flame-retardant antimicrobial agent is a polymer microsphere with the surface grafted thereof with a guanidine salt. The polymer microsphere has a cross-linked structure composed of a structural unit A derived from maleic anhydride, a structural unit B derived from a monomer M, and a structural unit C derived from a cross-linking agent. The monomer M is selected from a $C_4$-$C_9$ aliphatic olefin or a mixture thereof, and the guanidine salt comprises at least one guanidine salt having the property of flame resistance. The flame-retardant antimicrobial agent has both a good antimicrobial effect and a good flame-retardant effect. A flame-retardant antimicrobial thermoplastic resin composition containing the flame-retardant antimicrobial agent also has a good flame-retardant and antimicrobial performance and a good overall performance.

36 Claims, No Drawings

(56) References Cited

FOREIGN PATENT DOCUMENTS

| | | |
|---|---|---|
| CN | 106800652 A | 6/2017 |
| CN | 106835328 A | 6/2017 |
| CN | 107151430 A | 9/2017 |
| CN | 107879874 A | 4/2018 |
| CN | 107936233 A | 4/2018 |
| CN | 108440761 A | 8/2018 |
| CN | 109096601 A | 12/2018 |
| CN | 109705266 A | 5/2019 |
| CN | 109705270 A | 5/2019 |
| CN | 109705540 A | 5/2019 |
| CN | 111944155 A | 11/2020 |
| CN | 111944233 A | 11/2020 |
| CN | 112745456 A | 5/2021 |
| EA | 6401 B1 | 12/2005 |
| KR | 20110018584 A | 2/2011 |
| RU | 2350376 C2 | 3/2009 |
| RU | 2682581 C1 | 3/2019 |
| WO | 2019203740 A1 | 10/2019 |

OTHER PUBLICATIONS

Liu, Zhenjie et al., "Self-Stabilized Precipitation Polymerization and Its Application", Research, Sep. 10, 2018, vol. 2018, pp. 1-12.
"Free radical polymerization process methods", Jan. 31, 2002, http://www.chemistryculture.org/cypct-frontpage/cypolychemtech/PC-11-RadicalPolymerization/pcw9technonol.html.

FLAME-RETARDANT ANTIMICROBIAL AGENT, PREPARATION METHOD THEREFOR AND USE THEREOF, AND FLAME-RETARDANT ANTIMICROBIAL THERMOPLASTIC RESIN COMPOSITION

TECHNICAL FIELD

The present invention relates to the field of polymer processing and additives, and further, to a flame-retardant antibacterial agent, a preparation method therefor and use thereof, and to a flame-retardant antibacterial thermoplastic resin composition and an article, comprising the flame-retardant antibacterial agent.

BACKGROUND ART

In recent years, with the advancement of science and technology, such as the rise of intelligent and electric revolution, people's pursuit of high-quality and healthy life also continues to improve. Smart home appliances (such as an electric toilet, a smart refrigerator, an air conditioner, a washing machine and the like) and new energy vehicles have also gradually entered people's lives and played an increasingly important role. Such technology products have increasing requirements and standards for safety and health, among which fire safety and hygiene have become the top priority of people's concern, and have been widely studied and reported. Such products have certain requirements on both the flame retardancy (UL-94 vertical combustion test, glow wire flammability test) and hygiene of the materials used.

Currently, thermoplastic resin such as polypropylene (PP) is one of the most widely used and fastest growing kinds of general-purpose plastics. It has excellent properties such as high rigidity, high strength, good heat resistance, and easy processing, and is one of the matrix materials widely used in the above emerging products. However, PP itself is flammable and produces a large amount of molten droplets during combustion, and the flame spreads rapidly, thus the fire safety is poor. In addition, PP also needs to be antibacterially modified to improve the hygiene of the material. The flame-retardant modification of PP mainly includes the two kinds, intrinsic flame-retardant modification method and additive modification method. Among them, the additive modification method, which additionally adds high-efficiency flame retardants to PP, has been widely used due to its advantages such as simple operation, controllable cost, easy promotion and industrialization. The flame retardants used for PP mainly include halogen-based flame retardants, inorganic flame retardants, intumescent flame retardants (IFR) and the like. Halogen-based flame retardants have a relatively high flame-retardant efficiency for PP, but due to serious safety and environment hazards in their use, such use as separately adding a large amount of halogen-based flame retardants is increasingly limited. Inorganic flame retardants such as magnesium hydroxide, aluminum hydroxide, etc. are harmless to the environment, but they have a low flame-retardant efficiency, and require a higher addition amount to achieve a certain flame-retardant effect. In addition, they have a poor dispersibility in PP, have a great influence on the mechanical properties of the matrix, and thus they are also not suitable for separate use. IFR flame retardants have such advantages as high flame-retardant efficiency, low smoke and low toxicity. Compounding of a small amount of halogen-based, and phosphorus- and nitrogen-based flame retardants results in synergistically improved flame-retardant efficiency and has been widely recognized as one of the effective routes to achieve low halogenation or non-halogenation of flame-retardants. Because flame retardants generally have problems such as large addition amount and poor dispersibility in the matrix, flame-retardant synergists are introduced for the improvement of flame-retardant efficiency, which also reduces the influence on the processing performance and mechanical property of the material caused by the large addition amount of the flame retardants to a certain extent.

The preparation of an antibacterial plastic mainly comprises the steps that a matrix resin, an antibacterial agent and a process aid are mixed homogeneously in specific proportions; then they are directly melt blended to prepare a modified resin with antibacterial function; finally, various antibacterial articles are manufactured through various plastic molding processing methods (e.g., extruding, injection molding, casting, blow molding, blister molding, etc.). At present, the antibacterial agents available in the market mainly include the two main kinds, inorganic and organic antibacterial agents. Among them, inorganic antibacterial agents are mainly inorganic substances supporting antibacterial metal ions (such as one or more of silver ions, zinc ions, copper ions, etc.), and there are many kinds of supports that can be used for supporting, including zeolites (natural or synthetic zeolites), zirconium phosphate, soluble glass, calcium phosphate, silica gel, etc. Organic antibacterial agents are classified according to their structure, including guanidine salts, quaternary ammonium salts, quaternary phosphonium salts, imidazoles, pyridines, organometals, etc. Inorganic antibacterial agents have the characteristics of high safety, good heat resistance, and long-lasting sterilization. However, their sterilization is not instant, and the use of precious metals leads to their high price. Organic antibacterial agents have the advantages of fast sterilization speed, good antibacterial and anti-mildew effects, and wide application range, but they also have problems such as readily generated drug resistance and poor heat resistance.

At present, researchers achieve improvement in the flame-retardant property and antibacterial property of materials mainly by separately adding flame retardants and antibacterial agents (see, for example, the Chinese patent applications with publication numbers CN107151430A, CN 106149091A, and CN 106835328A). Due to the poor dispersibility of both the flame retardants and antibacterial agents in the matrix, adding them two separately may have a certain impact on the overall performance of the material. In particular, it should be pointed out that in order to realize the multiple functions of polymer materials, it is often necessary to add a large amount of multi-component additives separately, but the various additives may affect each other, thereby affecting the comprehensive performance of the materials. For example, when commercial antibacterial agents (Ag-based, Zn-based) are introduced, the flame-retardant property of the materials will be decreased.

Therefore, it is necessary to develop a single-component multifunctional additive with a higher efficiency to effectively realize the multi-functionalization of polymer materials.

DISCLOSURE OF THE INVENTION

In view of the above problems existing in the prior art, one object of the present invention is to provide a flame-retardant antibacterial agent, which can have both good antibacterial effect and good flame-retardant effect, and can be used as a single-component multifunctional additive to effectively realize the multi-functionalization of materials.

Another object of the present invention is to provide a method for preparing the flame-retardant antibacterial agent, which can be easily implemented, and especially can use readily available raw materials.

Another object of the present invention is to provide a flame-retardant antibacterial thermoplastic resin composition comprising the flame-retardant antibacterial agent, which has both good antibacterial effect and good flame retardancy, and is particularly suitable for the manufacture of resin compositions and articles for use in crowded places such as schools, hospitals and hotels as well as in emerging fields such as smart home appliances and new energy vehicles.

It has been unexpectedly found that by grafting a guanidine salt comprising at least one flame-retardant guanidine salt to the surface of a crosslinked polymer microsphere, which is formed by the crosslinking copolymerization of maleic anhydride, $C_4$-$C_9$ aliphatic olefin or a mixture thereof and a crosslinking agent, a single-component multifunctional additive simultaneously having good flame-retardant effect and antibacterial effect is obtained. Such polymer microsphere grafted with the guanidine salt has good dispersibility and compatibility in a polymer matrix, and can effectively endow the polymer matrix with good flame-retardant effect and antibacterial effect, thereby achieving the above objects.

Thus, in a first aspect, the present invention provides a flame-retardant antibacterial agent, which is a polymer microsphere grafted on its surface with a guanidine salt,
wherein the polymer microsphere comprises a crosslinked structure constituted by a structural unit A derived from maleic anhydride, a structural unit B derived from a monomer M, and a structural unit C derived from a crosslinking agent, and the monomer M is selected from the group consisting of $C_4$-$C_9$ aliphatic olefins and mixtures thereof; and
the guanidine salt comprises at least one flame-retardant guanidine salt.

The term "polymer microsphere" as used herein refers to a polymer particle having a diameter in the range from the nanoscale to the microscale and having a spherical or spheroidal shape.

The guanidine salt-grafted polymer microspheres have an average particle diameter preferably in the range of 200-2000 nm, such as 200 nm, 250 nm, 350 nm, 450 nm, 550 nm, 650 nm, 750 nm, 850 nm, 950 nm, 1050 nm, 1150 nm, 1250 nm, 1350 nm, 1450 nm, 1550 nm, 1650 nm, 1750 nm, 1850 nm, 2000 nm or any value between the above numerical values. The average particle diameter is characterized by the number average particle diameter, as measured by scanning electron microscopy.

The polymer microspheres are preferably monodispersed, i.e., polymer microspheres of uniform particle diameter. The dispersion coefficient of the particle diameter may be 1.05-1.0001. Such polymer microspheres with a narrow size distribution can advantageously promote the uniform dispersion of the flame-retardant antibacterial agent of the present invention in the matrix resin, thereby facilitating the uniform distribution of the grafted guanidine salt in the resin matrix and the final product, and thus providing better flame-retardant and antibacterial effects.

Preferably, the polymer microsphere as the graft base comprises a crosslinked alternating copolymer structure formed from maleic anhydride, a monomer M and a crosslinking agent. The use of such microspheres can advantageously improve the grafting efficiency of the guanidine salt and facilitate the uniform distribution of the grafted guanidine salt in the resin matrix and the final product; the increased content and uniform distribution of the maleic anhydride monomer unit is also beneficial to the uniform distribution and dispersion of the flame-retardant antibacterial agent microspheres in the resin matrix and the final product, or even an additional compatibilizer may not be used.

Herein, the structural unit formed after the polymerization of maleic anhydride is referred to as structural unit A, the structural unit formed after the polymerization of monomer M is referred to as structural unit B, and the structural unit formed after the polymerization of the crosslinking agent (or referred to as crosslinking monomer) is referred to as structural unit C.

Herein, the monomer M is selected from the group consisting of $C_4$-$C_9$ aliphatic olefins and mixtures thereof, preferably $C_4$ and/or $C_5$-aliphatic monoolefins or diolefins or mixtures of isomers thereof or mixtures of monoolefins and diolefins, for example, trans-2-butene, cis-2-butene, n-butene, isobutene or mixtures thereof, or isoprene, cyclopentadiene, 1,4-pentadiene, piperylene, 1-pentene, 2-pentene, cyclopentene, 2-methyl-1-butene, 2-methyl-2-butene or mixtures thereof.

As the monomer M, it is possible to use the $C_4$ and/or $C_5$ fractions from the oil refining or ethylene industry, preferably the $C_4$ and/or $C_5$ fractions from ethylene cracking in the petrochemical industry. The $C_4$ fractions from ethylene cracking may comprise trans-2-butene, cis-2-butene, n-butane, n-butene, isobutene and other substances. The $C_5$ fractions from ethylene cracking may comprise diolefins (isoprene, cyclopentadiene, 1,4-pentadiene, piperylene), monoolefins (1-pentene, 2-pentene, cyclopentene, 2-methyl-1-butene, 2-methyl-2-butene), alkanes (n-pentane, isopentane, cyclopentane, 2-methylbutane), alkynes (but-2-yne, 3-penten-1-yne) and other substances. As ethylene cracking products, the $C_4$ and $C_5$ fractions are readily available, and use of such mixed monomers to prepare polymer microspheres can help to increase the added value of the $C_4$ and $C_5$ fractions and reduce the cost of the method of the present invention.

In the polymer microspheres of the present invention, the molar ratio of the structural unit A to the structural unit B may range from (0.5:1) to (1:0.5), preferably from (0.75:1) to (1:0.75).

The crosslinking degree of the guanidine salt-grafted polymer microspheres may be ≥50%, such as 50%, 55%, 60%, 65%, 70%, 75%, 80%, 85%, 90% or any value between the above numerical values, preferably ≥70%, more preferably ≥90%. The crosslinking degree of the polymer microspheres is characterized by gel content, as measured by the solvent extraction method. The weight percentage of the dissolving-out substances from the polymer microspheres after 30 min in acetone of 5 times the weight thereof at 50° C. is preferably ≤8 wt %, such as 1 wt %, 2 wt %, 3 wt %, 4 wt %, 5.5 wt %, 6.5 wt %, 7.5 wt %, 8 wt % or any value between the above numerical values, correspondingly, the crosslinking degree is preferably ≥92%.

The guanidine salt-grafted polymer microspheres preferably have a shell crosslinked structure, and thus have a better solvent resistance and thermal stability.

As the crosslinking agent, which can also be referred to as crosslinking monomer, any suitable crosslinking monomer can be used, preferably a di-functional or higher-functional vinyl-containing monomer capable of free radical polymerization. More preferably, the crosslinking agent is at least one selected from the group consisting of divinylbenzene and acrylate-based crosslinking agents containing at least two acrylate-like groups.

The acrylate-like group preferably has the structural formula: —O—C(O)—C(R')=CH$_2$, wherein R' is H or a C$_1$-C$_4$ alkyl group; more preferably, the acrylate-like group is acrylate group and/or methacrylate group.

Preferably, the crosslinking agent is one or more selected from the group consisting of divinylbenzene, propylene glycol-based bis(meth)acrylate, ethylene glycol-based bis(meth)acrylate, trimethylolpropane tri(meth)acrylate, bis(trimethylolpropane) tetra(meth)acrylate, polyethylene glycol bis(meth)acrylate, phthalate ethylene glycol diacrylate, pentaerythritol tetra(meth)acrylate, dipentaerythritol penta(meth)acrylate, dipentaerythritol hexa(meth)acrylate and ethoxylated multifunctional acrylate.

The propylene glycol-based bis(meth)acrylate can be one or more selected from the group consisting of 1,3-propylene glycol dimethacrylate, 1,2-propylene glycol dimethacrylate, 1,3-propylene glycol diacrylate and 1,2-propylene glycol diacrylate. The ethylene glycol-based bis(meth)acrylate can be one or more selected from the group consisting of ethylene glycol dimethacrylate, ethylene glycol diacrylate, diethylene glycol dimethacrylate, diethylene glycol diacrylate, triethylene glycol dimethacrylate, triethylene glycol diacrylate, tetraethylene glycol dimethacrylate and tetraethylene glycol diacrylate.

Herein, the expression "(meth)acrylate" includes acrylates, methacrylates and mixtures thereof.

The guanidine salt in the present invention can be one or more selected from the group consisting of small molecule guanidine salts and guanidine salt polymers. Preferably, the guanidine salt comprises at least one small molecule guanidine salt and at least one guanidine salt polymer; more preferably, both the small molecule guanidine salt and the guanidine salt polymer are flame-retardant guanidine salts.

The small molecule guanidine salt is preferably at least one selected from the following substances: guanidine phosphate, guanidine hydrochloride, guanidine nitrate, guanidine hydrobromide, guanidine oxalate, guanidine dihydrogen phosphate, diguanidine hydrogen phosphate, and aminoguanidine salts such as inorganic acid salts and organic acid salts of monoaminoguanidine, diaminoguanidine and triaminoguanidine, such as carbonate, nitrate, phosphate, oxalate, hydrochloride, hydrobromide and sulfonate salts. More preferably, the small molecule guanidine salt is one or more selected from the group consisting of guanidine phosphate, guanidine hydrochloride, guanidine dihydrogen phosphate, diguanidine hydrogen phosphate and the nitrate, phosphate, hydrochloride, hydrobromide and sulfonate salts of monoaminoguanidine, diaminoguanidine and triaminoguanidine; further preferably one or more selected from the group consisting of guanidine phosphate, guanidine hydrochloride, guanidine dihydrogen phosphate, diguanidine hydrogen phosphate, guanidine hydrobromide, triaminoguanidine nitrate, monoaminoguanidine nitrate, triaminoguanidine phosphate, triaminoguanidine hydrochloride, triaminoguanidine hydrobromide and triaminoguanidine sulfonate.

The guanidine salt polymer is preferably at least one selected from the following substances: inorganic acid salts and organic acid salts of polyhexamethylene (bi)guanidine, such as polyhexamethylene (bi)guanidine hydrochloride, polyhexamethylene (bi)guanidine phosphate, polyhexamethylene (bi)guanidine acetate, polyhexamethylene (bi)guanidine oxalate, polyhexamethylene (bi)guanidine stearate, polyhexamethylene (bi)guanidine laurate, polyhexamethylene (bi)guanidine benzoate, polyhexamethylene (bi)guanidine sulfonate; and polyoxyethylene guanidine salt. More preferably, the guanidine salt polymer is one or more selected from the group consisting of polyhexamethylene (bi)guanidine hydrochloride, polyhexamethylene (bi)guanidine phosphate, hexamethylene (bi)guanidine sulfonate and polyhexamethylene (bi)guanidine oxalate.

The guanidine salt grafted on the polymer microspheres according to the present invention comprises at least one flame-retardant guanidine salt, thereby realizing the polymer microspheres having both antibacterial property and flame-retardant property. The flame-retardant guanidine salt contains a flame-retardant element, and preferably may contain phosphorus, halogen and/or nitrogen atom other than the nitrogen atom of the guanidine group. Preferably, the flame-retardant guanidine salt is at least one selected from the group consisting of guanidine phosphate, guanidine hydrochloride, guanidine hydrobromide, guanidine dihydrogen phosphate, diguanidine hydrogen phosphate, the phosphate, hydrochloride, hydrobromide, nitrate, carbonate, oxalate, sulfonate salts of aminoguanidine, and the above guanidine salt polymers; more preferably at least one selected from the group consisting of guanidine phosphate, guanidine hydrochloride, guanidine dihydrogen phosphate, diguanidine hydrogen phosphate, the phosphate, hydrochloride, hydrobromide, nitrate, sulfonate salts of aminoguanidine, polyhexamethylene (bi)guanidine hydrochloride and polyhexamethylene (bi)guanidine phosphate. The aminoguanidine can be at least one selected from the group consisting of monoaminoguanidine, diaminoguanidine and triaminoguanidine.

The expression "polyhexamethylene(bi)guanidine" herein refers to polyhexamethylene guanidine and/or polyhexamethylene biguanide.

The flame-retardant guanidine salt can comprise 30-100 wt % of the total weight of the guanidine salt; preferably 50-100 wt %; more preferably 80-100 wt %, for example, 30%, 35%, 40%, 45%, 50%, 55%, 60%, 65%, 70%, 75%, 80%, 85%, 90%, 95%, 96%, 97%, 98%, 99%, 99.5%, 99.9%, 100% (by weight).

In a second aspect of the present invention, the present invention provides a method for the preparation of a flame-retardant antibacterial agent according to the present invention, comprising: subjecting maleic anhydride, the monomer M and the crosslinking agent to crosslinking copolymerization reaction in the presence of an initiator to prepare polymer microspheres, and contacting the polymer microspheres with a guanidine salt to graft the guanidine salt onto the polymer microspheres, thereby obtaining the flame-retardant antibacterial agent.

The polymer microspheres are preferably prepared by a self-stabilizing precipitation polymerization method. The self-stabilizing precipitation polymerization is a reaction method for preparing monodispersed polymer microspheres without adding any stabilizer or dispersant and other additives. The polymer microspheres can be produced in one step. The obtained polymer microspheres are uniform in morphology and size, regular, controllable in structure and adjustable in particle diameter. An ester solvent with lower toxicity can be used. The resulting polymer system has a self-stabilizing characteristic. The flame-retardant antibacterial agent obtained by using said polymer microspheres has a good dispersibility in the matrix resin, and can achieve a better and more uniform distribution of the grafted guanidine salt, thereby facilitating improvement of the flame-retardant and antibacterial effects of the flame-retardant antibacterial agent.

Specifically, the method for the preparation of a flame-retardant antibacterial agent according to the present invention may comprise the following steps:

(1) in an organic solvent and in the presence of a first portion of an initiator, contacting maleic anhydride and a first portion of the monomer M for a partial reaction, and then introducing a feed comprising a crosslinking agent, preferably a solution comprising the crosslinking agent, for subsequent reaction, during which the subsequent reaction the reaction system comprises maleic anhydride, the monomer M and the crosslinking agent; wherein the feed comprising a crosslinking agent comprises the crosslinking agent, optionally a second portion of the monomer M and optionally a second portion of the initiator and optionally a solvent;

(2) adding a guanidine salt, for example, a solution of the guanidine salt, to the product obtained in step (1), to continue the reaction, so that the guanidine salt is grafted on the surface of the product obtained in step (1).

In step (1), the monomer M can be fed in one portion (that is, the amount of the second portion of the monomer M can be 0), or can be fed in two portions (that is, the amount of the second portion of the monomer M is greater than 0). The molar ratio of the second portion of the monomer M to the first portion of the monomer M can be (0-100):100, for example, 0, 1:100, 5:100, 15:100, 25:100, 30:100, 45:100, 50:100, 60:100, 70:100, 80:100, 90:100, 100:100, or any value between the above numerical values.

The amount ratio of maleic anhydride to monomer M can be conventionally selected, but in a preferred embodiment, relative to 100 mol of the maleic anhydride, the total amount of the monomer M (the total amount of the first portion of the monomer M and the second portion of the monomer M in terms of terminal olefins) can be 50 to 150 mol, more preferably 75 to 100 mol.

In step (1), the organic solvent can be a solvent commonly used in a solution polymerization reaction, particularly a self-stabilizing precipitation polymerization reaction, and preferably it can be selected from organic acid alkyl esters, or mixtures of organic acid alkyl esters and alkanes or aromatic hydrocarbons. The organic acid alkyl esters include but are not limited to: at least one of methyl formate, ethyl formate, propyl formate, butyl formate, isobutyl formate, amyl formate, methyl acetate, ethyl acetate, propyl acetate, butyl acetate, isobutyl acetate, sec-butyl acetate, amyl acetate, isoamyl acetate, benzyl acetate, methyl propionate, ethyl propionate, butyl propionate, methyl butyrate, ethyl butyrate, butyl butyrate, isobutyl butyrate, isoamyl butyrate, isoamyl isovalerate, methyl benzoate, ethyl benzoate, propyl benzoate, butyl benzoate, isoamyl benzoate, methyl phenylacetate and ethyl phenylacetate. The alkanes include, but are not limited to, n-hexane and/or n-heptane. The aromatic hydrocarbons include, but are not limited to, at least one of benzene, toluene and xylene.

The amount of the organic solvent can be conventionally selected, as long as it provides a suitable medium for the reaction of step (1). Preferably, the amount of the organic solvent can be 50 to 150 L relative to 100 mol of maleic anhydride.

In step (1), the initiator can be fed in one portion (that is, the amount of the second portion of the initiator can be 0), or can be fed in two portions (that is, the amount of the second portion of the initiator is greater than 0). The molar ratio of the second portion of the initiator to the first portion of the initiator can be (0 to 100):100, such as 0, 1:100, 5:100, 15:100, 25:100, 30:100, 45:100, 50:100, 60:100, 70:100, 80:100, 90:100, 100:100, or any value between the above numerical values.

In the method of the present invention, the total amount of the initiator is not particularly limited. Preferably, relative to 100 mol of maleic anhydride, the total amount of the initiator (the total amount of the first portion of the initiator and the second portion of the initiator) can be 0.05 to 10 mol, preferably 0.5 to 5 mol, more preferably 0.8 to 1.5 mol.

The initiator can be a reagent commonly used in the art for initiating the polymerization reaction of maleic anhydride and an olefin, for example, a thermal decomposition type initiator. Preferably, the initiator can be at least one selected from the group consisting of dibenzoyl peroxide, dicumyl peroxide, di-tert-butyl peroxide, dodecanoyl peroxide, tert-butyl peroxybenzoate, diisopropyl peroxydicarbonate, dicyclohexyl peroxydicarbonate, azobisisobutyronitrile and azobisisoheptanenitrile.

The amount of the crosslinking agent used in the method of the present invention is not particularly limited, as long as the desired crosslinking degree can be achieved. Preferably, relative to 100 mol of maleic anhydride, the amount of the crosslinking agent used can be 1 to 40 mol, preferably 6 to 20 mol.

The types of the crosslinking agent are as described above.

The feed of the crosslinking agent may comprise the crosslinking agent, optionally the remaining second portion of the monomer M and optionally the remaining second portion of the initiator and optionally a solvent, preferably in the form of a solution comprising a solvent. The kind and content of the solvent in the crosslinking agent-containing solution are not particularly limited, as long as the crosslinking agent, monomer, initiator and other substances therein are sufficiently dissolved. Typically, the kind of the solvent in the crosslinking agent-containing solution can be the same as the organic solvent used in the polymerization reaction, i.e., for example, including organic acid alkyl esters, as described above. The concentration of the crosslinking agent in the crosslinking agent-containing solution can be 0.2 to 3 mol/L.

In step (1), maleic anhydride is first contacted with the monomer M for a partial reaction, that is, maleic anhydride and the monomer M are not completely reacted, and are only partially involved in the polymerization reaction in the presence of an initiator, so that the unreacted maleic anhydride and monomer M are subsequently reacted with a crosslinking agent. The conditions under which maleic anhydride is contacted with the monomer M for reaction can be conventional conditions, as long as maleic anhydride and the monomer M are controlled to be only partially involved in the polymerization reaction. Preferably, the conditions under which maleic anhydride is contacted with the first portion of the monomer M for reaction include: an inert atmosphere (e.g., nitrogen); a temperature of 50 to 90° C. (further preferably 60 to 70° C.); a pressure (gauge pressure or relative pressure) of 0.3 to 1 MPa (further preferably 0.4 to 0.5 MPa); and a time period of 0.5 to 4 h (further preferably 0.5 to 2 h).

In step (1), after maleic anhydride is contacted with the monomer M for a partial reaction, a feed (preferably a solution) comprising a crosslinking agent is introduced for subsequent reaction, which is particularly beneficial to the formation of a shell crosslinked structure. The conditions for subsequent reaction can be conventional conditions, as long as the various reactants are allowed to participate in the reaction as much as possible. Preferably, the conditions for subsequent reaction include: a temperature of 50 to 90° C.; a pressure of 0.3 to 1 MPa; and a time period of 2 to 15 hours. The temperature and pressure for subsequent reaction can be the same as or different from the above temperature and pressure at which the maleic anhydride is contacted with the monomer M for the reaction. According to a preferred embodiment, the manner of introducing the crosslinking agent-containing solution for subsequent reaction may be as follows: adding the crosslinking agent-containing solution dropwise to the product obtained in step (1) within 1 to 3 h, at 50 to 90° C. (further preferably 60 to 70° C.), and further continuing the reaction for 1 to 4 h while maintaining the temperature.

In step (2), the guanidine salt, preferably a solution of the guanidine salt, more preferably an aqueous solution, is added to the product (suspension) obtained in the step (1), followed by a rapid stirring for reaction. The amount of the guanidine salt used can be conventionally selected, preferably, relative to 1000 g of maleic anhydride, the amount of the guanidine salt can be 5 g to 5000 g, preferably 20 g to 3000 g, more preferably 100 g to 2000 g. The concentration of the aqueous solution of the guanidine salt can be 0.5 to 50 wt %, preferably 1 to 30 wt %, more preferably 1 to 20 wt %. Relative to 1000 g of maleic anhydride, the amount of the aqueous solution of the guanidine salt can be 500 to 10000 g, preferably 1000 to 8000 g, more preferably 1000 to 6000 g.

The grafting reaction in step (2) can be carried out under conventional conditions, for example, the conditions for the grafting reaction may include: a temperature of 0 to 100° C., preferably 2.5 to 90° C., more preferably 5 to 80° C., further preferably 30-80° C.; a time period of the reaction of 0.5 to 10 h, preferably 0.5 to 8 h, more preferably 0.5 to 6 h; and a stirring speed of 50 to 1000 rpm, preferably 50 to 500 rpm, more preferably 100 to 500 rpm.

In step (2), the product (suspension) obtained in step (1) can also be subjected to post-treatment (separation, washing and drying) before the grafting reaction. The product obtained after drying can be added to a solution of the guanidine salt, preferably an aqueous solution, for the reaction. The washing can use conventional washing solvents, for example, at least one selected from the group consisting of n-hexane, isohexane, cyclohexane, n-heptane, n-octane, isooctane, methanol, ethanol, propanol, isopropanol, diethyl ether, isopropyl ether and methyl tert-butyl ether. The concentration of the aqueous solution of the guanidine salt can be 0.5 to 50 wt %, preferably 1 to 30 wt %.

The final product obtained in step (2) can be further subjected to a separation treatment to obtain a flame-retardant antibacterial microsphere product grafted with a guanidine salt. For example, the separation treatment can be carried out in the following manner: centrifugal separation, water washing, organic solvent washing (the aforementioned washing solvents can be used, i.e., at least one selected from the group consisting of n-hexane, isohexane, cyclohexane, n-heptane, n-octane, iso-octane, methanol, ethanol, propanol, isopropanol, diethyl ether, isopropyl ether and methyl tert-butyl ether), centrifugal separation, and drying (e.g., vacuum drying). Unexpectedly, it has been found that in step (2), the suspension obtained in step (1) can be directly involved in grafting reaction with a solution of the guanidine salt (preferably an aqueous solution) without carrying out a step of removing the organic solvent, which can also effectively prepare the guanidine salt flame-retardant antibacterial microsphere product of the present invention, i.e., flame-retardant antibacterial agent. Therefore, according to a preferred embodiment, in step (2), the product (suspension) obtained in step (1) can be directly reacted with the solution of the guanidine salt (one-pot process), thus to obtain a mixed system comprising the guanidine salt flame-retardant antibacterial microspheres; and after a further separation treatment of said mixed system, the guanidine salt flame-retardant antibacterial microsphere product can be obtained. For example, the separation treatment can be carried out in the following manner: standing for layering, wherein the organic phase is used for recycling, and the heavy phase is subjected to centrifugal separation, water washing-centrifugal separation, and drying (e.g., vacuum drying) to obtain the guanidine salt flame-retardant antibacterial microspheres. The product post-treatment of this one-pot process requires only one-time liquid-liquid separation, solid-liquid separation, washing and drying, and it can effectively shorten the time consumption of a single batch, simplify the process flow, reduce the unit equipment, and effectively reduce energy consumption. The process only needs one organic solvent as the reaction medium; the solvent can be recycled only by layering and drying operations; layering can be achieved in the reactor without a special water separation device; and the solvent can be recycled without distillation purification, thereby energy is saved and the consumption is reduced, and the environmental pollution caused by the use of organic solvents can be effectively reduced.

In a third aspect, the present invention provides the use of the flame-retardant antibacterial agent according to the present invention as an additive in flame-retardant antibacterial resin compositions and articles (particularly fibers, films and fabrics, e.g., non-woven fabrics), for example, flame-retardant antibacterial thermoplastic resin compositions and articles, particularly in articles for schools, hospitals, hotels, smart home appliances, new energy vehicles, etc.

In a fourth aspect, the present invention provides a flame-retardant antibacterial thermoplastic resin composition comprising a thermoplastic resin as a matrix, and a flame-retardant antibacterial agent according to the present invention. Based on 100 parts by weight of the thermoplastic resin, the flame-retardant antibacterial agent may be used in an amount of 0.05 to 4.0 parts by weight, preferably 0.1 to 2.8 parts by weight, and more preferably 0.5 to 2 parts by weight.

The thermoplastic resin as the matrix can be at least one selected from the group consisting of polyolefin, polystyrene, polyvinyl chloride, acrylonitrile/butadiene/styrene copolymer, acrylonitrile/styrene copolymer, polyoxymethylene, nylon, polyethylene terephthalate, polybutylene terephthalate, polymethyl methacrylate, polycarbonate, polyphenylene oxide, polyphenylene sulfide and/or at least one selected from the group consisting of alloys and mixtures of the thermoplastic resins, preferably, at least one selected from the group consisting of polyolefins, especially polyethylene and polypropylene and copolymers thereof.

The flame-retardant antibacterial thermoplastic resin composition preferably further comprises an aluminum hypophosphite-based flame retardant and/or a halogen-containing flame retardant. Thus a synergistic effect can be produced between the flame-retardant antibacterial microspheres of the present invention and the aluminum hypophosphite-based flame retardant and/or the halogen-containing flame retardant through the establishment of a hybrid carbon layer structure, so that the flame-retardant antibacterial property of the composition is remarkably better than the property of the composition using the same added amount of the flame-retardant antibacterial microspheres of the present invention, aluminum hypophosphite-based flame retardant or halogen-containing flame retardant separately. More preferably, the resin composition comprises an aluminum hypophosphite-based flame retardant and a halogen-containing flame retardant simultaneously. Due to the synergistic effect, the total added amount of flame retardants can be significantly reduced under the circumstance of achieving the same flame-retardant effect.

The aluminum hypophosphite-based flame retardant can be selected from the group consisting of inorganic aluminum hypophosphite and aluminum alkyl phosphinates (for example, at least one of aluminum diethylphosphinate, aluminum dipropylphosphinate, and aluminum phenylphosphinate) and combinations thereof preferably selected from the group consisting of inorganic aluminum hypophosphite and aluminum diethylphosphinate and combinations thereof. Based on 100 parts by weight of the thermoplastic resin, the amount of the aluminum hypophosphite-based flame retardant can be 0 to 2.0 parts by weight, preferably 0.1 to 1.2 parts by weight, more preferably 0.1 to 0.6 parts by weight. The halogen-containing flame retardant is preferably melamine hydrohalide, more preferably melamine hydrobromide (MHB). Based on 100 parts by weight of the thermoplastic resin, the amount of the halogen-containing flame retardant can be 0 to 2.0 parts by weight, preferably 0.1 to 1.2 parts by weight. more preferably 0.1 to 0.8 parts by weight.

The flame-retardant antibacterial thermoplastic resin composition preferably further comprises a flame-retardant synergist and/or an anti-mildew agent. The addition of the flame-retardant synergist can further improve the flame-retardant efficiency, and the addition of the anti-mildew agent can further improve the antibacterial efficiency, so that the total added amount of the flame retardants or antibacterial agents can be reduced under the circumstance of achieving the same flame-retardant or antibacterial effect.

The flame-retardant synergist can be selected from the group consisting of 2,3-dimethyl-2,3-diphenylbutane (DMDPB, "bicumyl" for short), paracumene polymer (polybicumyl) and combination thereof. Based on 100 parts by weight of the thermoplastic resin, the amount of the flame-retardant synergist can be 0 to 1.0 parts by weight, preferably 0.05 to 1 part by weight, more preferably 0.05 to 0.6 parts by weight.

The anti-mildew agent can be at least one selected from the group consisting of pyrithiones, isothiazolinones, 10,10'-oxybisphenoxarsine (OBPA), 3-iodo-2-propynyl-butyl-carbamate (IPBC), 2,4,4'-trichloro-2'-hydroxydiphenyl ether (triclosan), 2-(thiazol-4-yl) benzimidazole (thiabendazole), etc., which have a good anti-mildew effect. The pyrithiones may be, for example, at least one selected from the group consisting of zinc pyrithione, copper pyrithione, bispyrithione, and the like. The isothiazolinones may be, for example, at least one selected from the group consisting of 2-methyl-1-isothiazolin-3-one (MIT), 5-chloro-2-methyl-1-isothiazolin-3-one (CMIT), 2-n-octyl-4-isothiazolin-3-one (OIT), 4,5-dichloro-2-n-octyl-3-isothiazolinone (DCOIT), 1,2-benzisothiazol-3-one (BIT), 4-methyl-1,2-benzisothiazolin-3-one (MBIT), 4-n-butyl-1,2-benzisothiazolin-3-one (BBIT) and the like.

Based on 100 parts by weight of the thermoplastic resin, the anti-mildew agent may be used in an amount of 0 to 5.0 parts by weight, preferably 0.05 to 4.0 parts by weight, more preferably 0.1 to 3.6 parts by weight.

For example, the flame-retardant antibacterial thermoplastic resin composition may comprise the following components based on 100 parts by weight of the thermoplastic resin:

0.05 to 4.0 parts by weight, preferably 0.1 to 2.8 parts by weight, more preferably 0.5 to 2 parts by weight of the flame-retardant antibacterial agent according to the present invention;

0 to 2.0 parts by weight, preferably 0.1 to 1.2 parts by weight, more preferably 0.1 to 0.6 parts by weight of an aluminum hypophosphite-based flame retardant;

0 to 2.0 parts by weight, preferably 0.1 to 1.2 parts by weight, more preferably 0.1 to 0.8 parts by weight of melamine hydrobromide;

0 to 1.0 part by weight, preferably 0.05 to 1 part by weight, more preferably 0.05 to 0.6 parts by weight of a flame-retardant synergist; and 0 to 5.0 parts by weight, preferably 0.05 to 4.0 parts by weight, more preferably 0.1 to 3.6 parts by weight of an anti-mildew agent.

In addition, the flame-retardant antibacterial thermoplastic resin composition of the present invention may further comprise other functional additives as required, including but not limited to: at least one of antioxidants, light stabilizers, toughening agents, compatibilizers, pigments, dispersants, etc. Based on 100 parts by weight of the thermoplastic resin, the amount of the other functional additives can be 0.1 to 100 parts by weight, and the specific amount can be adjusted on demand.

The present invention further provides a method for the preparation of the flame-retardant antibacterial thermoplastic resin composition, comprising the step of melt blending the components including the thermoplastic resin and the antibacterial flame retardant, which may specifically comprise the following steps:

a. homogeneously mixing the components including the thermoplastic resin and the antibacterial flame retardant according to the present invention, and optionally an aluminum hypophosphite-based flame retardant, a halogen-containing flame retardant (preferably melamine hydrobromide), a flame-retardant synergist and an anti-mildew agent, for example, by using a high-speed mixer;

b. extruding and pelletizing the mixed premix in step a, for example, by using a commonly-used instrument and equipment in the art, such as a twin-screw extrusion pelletizer, etc., wherein, after further drying, the pellets of the flame-retardant antibacterial thermoplastic resin composition can be obtained.

In a fifth aspect of the present invention, the present invention also provides articles prepared from the flame-retardant antibacterial thermoplastic resin composition according to the present invention, especially in the form of fibers, films and fabrics, e.g., nonwoven fabrics. These articles are particularly useful for schools, hospitals, hotels, smart home appliances, and new energy vehicles and other fields.

The flame-retardant antibacterial agent (i.e., guanidine salt flame-retardant antibacterial microspheres) according to the present invention has both good flame-retardant and antibacterial effects, and is an effective single-component flame-retardant antibacterial multifunctional additive. Compared with the current method with a flame retardant and an antibacterial agent added separately, said guanidine salt microspheres are easier to disperse into the thermoplastic resin matrix, thereby the flame-retardant and antibacterial efficiency can be effectively improved.

At the same time, the guanidine salt flame-retardant antibacterial microspheres have good fluidity and low moisture absorption, do not adhere to the wall during the preparation of the flame-retardant antibacterial thermoplastic resin composition, are easy to unload and simple in production operations, and do not require excessive control of the production conditions.

Since the microspheres comprise maleic anhydride structural unit, especially in the case that they comprise a crosslinked alternating copolymer structure formed by maleic anhydride, a $C_4$-$C_9$ aliphatic olefin and a crosslinking agent, compatibility of the microspheres with the matrix resin can be significantly improved, and dispersion of the microspheres in the matrix resin can be improved, thus the antibacterial and flame-retardant effect and efficiency can be further improved, or even non-use of a compatibilizer can be achieved, thereby avoiding the adverse influence on the flame-retardant and antibacterial effect brought about by the compatibilizer.

In the case that microspheres are prepared by the self-stabilizing precipitation polymerization method, the obtained microspheres are uniform in morphology and size and regular, and can show a better dispersion in the matrix resin and achieve a better and more uniform distribution of the grafted guanidine salt in the matrix resin, thereby obtaining a better flame-retardant and antibacterial effect and efficiency; in addition, the obtained microspheres have a controllable structure and adjustable particle diameter, making the production process simpler and more controllable.

The microspheres can be prepared by using, as monomers, the $C_4$ and $C_5$ fractions from the oil refining or ethylene industry, especially the $C_4$ and $C_5$ fractions as the ethylene cracking product in the petrochemical industry, which provides a new approach for the utilization of the mixed olefin resource in the petrochemical industry and contributes to the improvement of the added value of its product.

The flame-retardant antibacterial agent of the present invention also expands the technical reserves for meeting the requirements of fire safety and antibacterial property.

The flame-retardant antibacterial thermoplastic resin composition comprising the flame-retardant antibacterial agent of the present invention also has good flame retardancy and antibacterial property at the same time, even have a good anti-mildew effect, and can also have a good water resistance, especially in the case of using the microspheres having a shell crosslinking structure.

Since the flame-retardant antibacterial agent of the present invention is an efficient multifunctional single-component flame-retardant antibacterial microsphere, a flame-retardant antibacterial thermoplastic resin composition with a low addition amount can be prepared. Since both the flame-retardant efficiency and the antibacterial efficiency of the additive are improved, the addition amount of the additive is reduced. At the same time, the dispersion performance is improved. Therefore, the prepared thermoplastic resin composition has an excellent comprehensive performance.

EXAMPLES

In the following, the present invention is further illustrated in combination with the examples, but without being limited by these examples.

1) Sources of Starting Materials

Polyethylene (PE): brand 7042, Maoming Petrochemical, China

Polypropylene (PP): GD-H-230, Cangzhou Refining & Chemical, China

Nylon 6: brand B3S, BASF

PC: polycarbonate, brand 3103, Bayer

ABS: acrylonitrile/butadiene/styrene copolymer, brand 3504, Shanghai Gaoqiao, China Polyhexamethyleneguanidine phosphate: Foshan Lanfeng Additives, China Guanidine dihydrogen phosphate: Beshine (Beijing) Chemical Technology Co., Ltd., China Guanidine hydrobromide: SHANGHAI ZZBIO CO., LTD, China Aminoguanidine nitrate: Guangdong Wengjiang Chemical, China Bicumyl: Guangzhou Xijia Chemical, China Melamine hydrobromide: Guangzhou Xijia Chemical, China Aluminum hypophosphite: Guangzhou Xijia Chemical, China Zinc pyrithione, copper pyrithione: Zhufeng Fine Chemical Co., Ltd., China Compounded antioxidant: obtained by homogeneously mixing antioxidant 1010 (BASF), antioxidant 168 (BASF), and calcium stearate (Shandong Hao Na, China) in the mass ratio of 2/2/1

Silver-supporting zeolite antibacterial agent: Xi'an Conval Antibacterial Technology Co., Ltd., China 2) Test Methods and Equipment Average particle diameter of the microspheres: characterized by the number-average particle diameter, as measured by the S-4800 scanning electron microscope from the Hitachi Company, Japan.

Tensile strength: determined according to standard GB/T1040-2006.

Flexural modulus: determined according to standard GB/T 9341-2008.

Antibacterial test: tested according to standard GB/T 31402-2015. Specifically, the antibacterial test adopted the film sticking method, and the operation steps were as follows: after sterilization, the sample to be tested was inoculated on its surface with a bacterial suspension, and covered with a polyethylene film, so that a uniform liquid film was formed between the sample and the film. After being cultured under certain conditions, elution was performed, followed by dilution to an appropriate concentration gradient; a certain volume was taken to spread in the culture medium for re-culturing and the number of viable bacteria was determined to calculate the antibacterial rate.

Vertical burning test (UL-94): tested according to standard GN/T 2408-2008. The flammability of the specimen was tested by the CZF-2 vertical flammability tester (Shangyuan Instruments, Nanjing, China). The specimen was a bar sample of 120 mm×10 mm×10 mm.

The specific rating standard for the UL-94 test is shown below.

| Burning behavior of specimens | V-0 | V-1 | V-2 |
|---|---|---|---|
| Afterflame time for each individual specimen after flame application (s) | <10 | <30 | <30 |
| Afterglow time for each individual specimen after the second flame application (s) | <30 | <60 | <60 |
| Afterflame time for each set of 5 specimens after 10 flame applications (s) | <50 | <250 | <250 |
| Afterflame or afterglow of any specimen up to the holding clamp | No | No | No |
| Absorbent cotton ignited by flaming drips of any specimen | No | No | Yes |

HB level: the lowest flame retardant level in the UL-94 standard. The requirements include a burning rate of less than 40 mm per minute for specimens having a thickness of 3-13 mm; a burning rate of less than 70 mm per minute for specimens having a thickness less than 3 mm; or ceasing to burn before the 100 mm reference mark.

If the specimen fails to reach the HB level, it is reported as no rating (NR).

Limiting oxygen index (LOI value) experiment: tested according to standard GB/T 2406.1-2008.

Glow wire flammability index experiment: tested according to standard GB/T5961.11-2006.

Crosslinking degree: the crosslinking degree of the microspheres was characterized by gel content, as measured by a solvent extraction method. The specific method was as follows: weighing the sample to be tested as $W_1$, then placing the sample to be tested in acetone of 5 times the weight thereof, extracting it at 50° C. for 30 min, and after the completion of the extraction, drying and weighing the sample as $W_2$. The crosslinking degree is calculated as $W_2/W_1 \times 100\%$. The content of dissolving-out substances is calculated as $(1-W_2/W_1) \times 100\%$.

1. Preparation of Guanidine Salt Flame-Retardant Antibacterial Microspheres (Flame-Retardant Antibacterial Agent)

Example 1

(1) The $C_4$ fraction from the ethylene cracking process of the Sinopec Zhenhai Refining & Chemical, China, was used. The $C_4$ fraction was a mixed butene gas having the following composition: trans-2-butene: 40.83% by weight; cis-2-butene: 18.18% by weight; n-butane: 24.29% by weight; n-butene: 9.52% by weight; isobutene: 2.78% by weight; and others: 4.4% by weight. In an autoclave, 100 g of maleic anhydride and 2 g of azobisisobutyronitrile were dissolved in 800 mL of isoamyl acetate to form solution 1, and the well metered mixed butenes (wherein the molar ratio of maleic anhydride to the effective component (terminal olefins) in the mixed olefins was 1:1) were passed thereinto. The reaction was performed at 70° C. and 0.5 MPa for 1 hour under a nitrogen atmosphere.

(2) 25 g of divinylbenzene was dissolved in 200 mL of isoamyl acetate to prepare solution 2. Solution 2 was added dropwise to the reaction system obtained in (1) by a plunger pump for 2 hours. After the completion of the dropwise addition, the reaction system continued to react for 3 hours while maintaining the temperature.

(3) After the above reaction, the autoclave was decompressed, and 200 g of an aqueous solution of guanidine dihydrogen phosphate (15 wt %) and 200 g of an aqueous solution of polyhexamethylene biguanide hydrochloride (15 wt %) were added for reaction at 80° C. for 3 hours. The system after the reaction was left to stand for layering, wherein the heavy phase was centrifuged by a centrifuge at 5000 rad/min for 20 minutes, and the obtained solid was washed with 4 L of water under stirring and centrifuged by a centrifuge at 5000 rad/min for 20 minutes; again, the obtained solid was washed with 4 L of water under stirring and centrifuged by a centrifuge at 5000 rad/min for 20 minutes; and the resulting solid was dried under vacuum to obtain the flame-retardant antibacterial agent, i.e., polymer microspheres #1 grafted with guanidine salt on the surface. The average particle diameter of the obtained polymer microspheres was 1280 nm. The weight percentage of the dissolving-out substances from the obtained polymer microspheres in acetone of 5 times the weight thereof at 50° C. for 30 min was 5.5%, and correspondingly, the crosslinking degree was 94.5%.

Example 2

The flame-retardant antibacterial agent was prepared as in Example 1, except that the system after the reaction in step (2) was centrifuged by a centrifuge at 5000 rad/min for 30 minutes to obtain crosslinked mixed butene/maleic anhydride polymer microspheres, which were purified by washing with n-hexane and dried under vacuum. Then, the dried crosslinked mixed butene/maleic anhydride polymer microspheres were added to 400 g of a mixed aqueous solution of guanidine dihydrogen phosphate (20 wt %) and polyhexamethylene biguanide hydrochloride (20 wt %) and reacted at 80° C. for 3 hours. The system after the reaction was centrifuged by a centrifuge at 5000 rad/min for 20 minutes, the obtained solid was washed with 4 L of water under stirring and centrifuged by a centrifuge at 5000 rad/min for 20 minutes; again, the obtained solid was washed with 4 L of water under stirring and centrifuged by a centrifuge at 5000 rad/min for 20 minutes; and the resulting solid was dried under vacuum to obtain the flame-retardant antibacterial agent, i.e., polymer microspheres #2 grafted with guanidine salt on the surface. The average particle diameter of the obtained polymer microspheres was 1310 nm. The weight percentage of the dissolving-out substances from the obtained polymer microspheres in acetone of 5 times the weight thereof at 50° C. for 30 min was 5.6%, and correspondingly, the crosslinking degree was 94.4%.

Example 3

(1) In an autoclave, 100 g of maleic anhydride and 2 g of azobisisobutyronitrile were dissolved in 800 mL of isoamyl acetate to form solution 1, and the well metered mixed butenes (whose composition was the same as that in Example 1, and wherein the molar ratio of maleic anhydride to the effective component (terminal olefins) in the mixed olefins was 1:1) were passed thereinto. The reaction was performed at 70° C. and 0.4 MPa for 2 hours under a nitrogen atmosphere.

(2) 15 g of divinylbenzene was dissolved in 200 mL of isoamyl acetate to prepare solution 2. Solution 2 was added dropwise to the reaction system by a plunger pump for 2 hours. After the completion of the dropwise addition, the reaction system continued to react for 3 hours while maintaining the temperature.

(3) After the above reaction, the autoclave was decompressed, and 200 g of an aqueous solution of guanidine hydrobromide (20 wt %) and 200 g of an aqueous solution of polyhexamethyleneguanidine phosphate (20 wt %) were added separately for reaction at 60° C. for 7 hours. The system after the reaction was left to stand for layering, wherein the heavy phase was centrifuged by a centrifuge at 5000 rad/min for 20 minutes, the obtained solid was washed with 4 L of water under stirring, and centrifuged by a centrifuge at 5000 rad/min for 20 minutes; again, the obtained solid was washed with 4 L of water under stirring, and centrifuged by a centrifuge at 5000 rad/min for 20 minutes; and the resulting solid was dried under vacuum to obtain the flame-retardant antibacterial agent, i.e., polymer microspheres #3 grafted with guanidine salt on the surface. The average particle diameter of the obtained polymer microspheres was 1210 nm. The weight percentage of the dissolving-out substances from the obtained polymer microspheres in acetone of 5 times the weight thereof at 50° C. for 30 min was 6.5%, and correspondingly, the crosslinking degree was 93.5%.

Example 4

(1) In an autoclave, 100 g of maleic anhydride and 1.5 g of azobisisobutyronitrile were dissolved in 800 mL of isoamyl acetate to form solution 1, and the well metered mixed butenes (whose composition was the same as that in Example 1, and wherein the molar ratio of maleic anhydride to the effective component (terminal olefins) in the mixed olefins was 1:0.75) were passed thereto. The reaction was performed at 70° C. and 0.5 MPa for 1 hour under a nitrogen atmosphere.

(2) 0.5 g of azobisisobutyronitrile and 18 g of divinylbenzene were dissolved in 200 mL of isoamyl acetate to prepare solution 2. Solution 2 was added dropwise to the reaction system by a plunger pump for 2 hours. After the completion of the dropwise addition, the reaction system continued to react for 3 hours while maintaining the temperature.

(3) After the above reaction, the autoclave was decompressed, and 200 g of an aqueous solution of guanidine dihydrogen phosphate (20 wt %), 200 g of an aqueous solution of guanidine hydrobromide (20 wt %) and 200 g of an aqueous solution of polyhexamethylene guanidine phosphate (20 wt %) were added separately and reacted at 60° C. for 10 hours. The system after the reaction was left to stand for layering, wherein the heavy phase was centrifuged by a centrifuge at 5000 rad/min for 20 minutes, the obtained solid was washed with 4 L of water under stirring and centrifuged by a centrifuge at 5000 rad/min for 20 minutes; again, the obtained solid was washed with 4 L of water under stirring and centrifuged by a centrifuge at 5000 rad/min for 20 minutes; and the resulting solid was dried under vacuum to obtain the flame-retardant antibacterial agent, i.e., polymer microspheres #4 grafted with guanidine salt on the surface. The average particle diameter of the obtained polymer microspheres was 1510 nm. The weight percentage of the dissolving-out substances from the obtained polymer microspheres in acetone of 5 times the weight thereof at 50° C. for 30 min was 5.8%, and correspondingly, the crosslinking degree was 94.2%.

Example 5

(1) The $C_5$ fraction from the ethylene cracking process of the Sinopec Zhenhai Refining & Chemical, China, was used. The mixed gas of the $C_5$ fraction had the following composition: diolefins (isoprene, cyclopentadiene, 1,4-pentadiene, piperylene): 47.83% by weight; monoolefins (1-pentene, 2-pentene, cyclopentene, 2-methyl-1-butene, 2-methyl-2-butene): 13.18% by weight; alkanes (n-pentane, isopentane, cyclopentane, 2-methylbutane): 21.29% by weight; alkynes (but-2-yne, 3-penten-1-yne): 0.92% by weight; and others: 16.78% by weight. In an autoclave, 100 g of maleic anhydride and 2 g of azobisisobutyronitrile were dissolved in 800 mL of isoamyl acetate to form solution 1, and the well metered mixed $C_5$ (wherein the molar ratio of maleic anhydride to the effective component (terminal olefins) in the mixed olefins was 1:0.5) was passed thereinto. The reaction was performed at 70° C. and 0.5 MPa for 1 hour under a nitrogen atmosphere.

(2) The well metered $C_5$ fraction (wherein the molar ratio of maleic anhydride to the effective component (terminal olefins, including diolefins) in said part of mixed olefins was 1:0.5) and 15 g of divinylbenzene were dissolved in 200 mL of isoamyl acetate to prepare solution 2, the solution 2 was added dropwise to the reaction system by a plunger pump for 2 hours. After the completion of the dropwise addition, the reaction system continued to react for 3 hours while maintaining the temperature.

(3) After the above reaction, the autoclave was decompressed, and the system was left to stand for layering, wherein the heavy phase was centrifuged by a centrifuge at 5000 rad/min for 20 minutes, the obtained solid was washed with 400 mL of water under stirring and centrifuged by a centrifuge at 5000 rad/min for 20 minutes; again, the obtained solid was washed with 400 mL of water under stirring and centrifuged by a centrifuge at 5000 rad/min for 20 minutes and the resulting solid was dried under vacuum to obtain crosslinked mixed pentene/maleic anhydride polymer microspheres.

(4) 100 g of the crosslinked mixed pentene/maleic anhydride polymer microsphere was added to 400 g of a mixed solution of aminoguanidine nitrate (15 wt %) and polyhexamethylene biguanide phosphate (15 wt %) and reacted at 50° C. for 6 hours. The system after the reaction was centrifuged by a centrifuge at 5000 rad/min for 20 minutes, and the obtained solid was washed with 4 L of water under stirring and centrifuged by a centrifuge at 5000 rad/min for 20 minutes; again, the obtained solid was washed with 4 L of water under stirring, and centrifuged by a centrifuge at 5000 rad/min for 20 minutes; and the resulting solid was dried under vacuum to obtain the flame-retardant antibacterial agent, i.e., polymer microspheres #5 grafted with guanidine salt on the surface. The average particle diameter of the obtained polymer microspheres was 1458 nm. The weight percentage of the dissolving-out substances from the obtained polymer microspheres in acetone of 5 times the weight thereof at 50° C. for 30 min was 5.6%, and correspondingly, the crosslinking degree was 94.4%.

Example 6

A flame-retardant antibacterial agent was prepared as in Example 5, except that the amount of divinylbenzene in step (2) was changed to 10 g, and finally polymer microspheres #6 were obtained. The average particle diameter of the obtained polymer microspheres was 1200 nm. The weight percentage of the dissolving-out substances from the obtained polymer microspheres in acetone of 5 times the weight thereof at 50° C. for 30 min was 7.0%, and correspondingly, the crosslinking degree was 93.0%.

Example 7

The flame-retardant antibacterial agent was prepared as in Example 1, except that the divinylbenzene in step (1) was replaced with 36.0 g of pentaerythritol tetraacrylate, and finally polymer microspheres #7 were obtained. The average particle diameter of the obtained polymer microspheres was 1320 nm. The weight percentage of the dissolving-out substances from the obtained polymer microspheres in acetone of 5 times the weight thereof at 50° C. for 30 min was 5.2%, and correspondingly, the crosslinking degree was 94.8%.

2. Preparation and Property Comparison of Flame-Retardant Antibacterial Thermoplastic Resin Compositions and Comparative Resin Compositions The formulations of the resin compositions used in the Examples and Comparative Examples are shown in Table 1, and the amounts in Table 1 are all in parts by weight. The properties of the resin compositions prepared in the Examples and Comparative Examples are shown in Table 2.

Example 8

100 parts by weight of polypropylene, 1.0 parts by weight of the polymer microspheres #1, 0.2 parts by weight of aluminum hypophosphite, 0.35 parts by weight of MHB (melamine hydrobromide), 0.1 parts by weight of the flame-retardant synergist DMDPB (bicumyl), 0.2 parts by weight of zinc pyrithione and 0.25 parts by weight of the compounded antioxidant were charged into a high-speed mixer and sufficiently and homogeneously stirred, and then the mixed mass was melt blended through a twin-screw extruder, with the extruder temperature being 190° C. to 220° C. (the temperatures of the various zones: 190° C., 210° C., 220° C., 220° C., 215° C., and 210° C.) and the rotating speed being 350 r.p.m., and extruded and pelletized. The obtained pellets were dried in a thermostatic oven at 90° C. for 3 hrs, and then, injection molded at an injection molding temperature of 200 to 220° C. into standard splines of specified size for flame-retardant, antibacterial and mechanical property tests.

Comparative Example 1

100 parts by weight of polypropylene and 0.25 parts by weight of the compounded antioxidant were charged into a high-speed mixer and sufficiently and homogeneously stirred, and then the mixed mass was melt blended through a twin-screw extruder, with the extruder temperature being 190° C. to 220° C. (the temperatures of the various zones: 190° C., 210° C., 220° C., 220° C., 215° C., and 210° C.) and the rotating speed being 350 r.p.m., and extruded and pelletized. The obtained pellets were dried in a thermostatic oven at 90° C. for 3 hrs, and then, injection molded at an injection molding temperature of 200 to 220° C. into standard splines of specified size for flame-retardant, antibacterial and mechanical property tests.

Comparative Example 2

100 parts by weight of polypropylene, 1.0 parts by weight of the silver-supporting zeolite antibacterial agent, 0.2 parts by weight of aluminum hypophosphite, 0.35 parts by weight of MHB, 0.1 parts by weight of the flame-retardant synergist DMDPB, 0.2 parts by weight of zinc pyrithione and 0.25 parts by weight of the compounded antioxidant were charged into a high-speed mixer and sufficiently and homogeneously stirred, and then the mixed mass was melt blended through a twin-screw extruder, with the extruder temperature being 190° C. to 220° C. (the temperatures of the various zones being: 190° C., 210° C., 220° C., 220° C., 215° C., and 210° C.) and the rotating speed being 350 r.p.m., and extruded and pelletized. The obtained pellets were dried in a thermostatic oven at 90° C. for 3 hrs, and then, injection molded at an injection molding temperature of 200 to 220° C. into standard splines of specified size for flame-retardant, antibacterial and mechanical property tests.

Example 9

100 parts by weight of polypropylene, 1.0 parts by weight of the polymer microspheres #2, 0.2 parts by weight of aluminum hypophosphite, 0.35 parts by weight of MHB, 0.1 parts by weight of the flame-retardant synergist DMDPB, 0.2 parts by weight of zinc pyrithione and 0.25 parts by weight of the compounded antioxidant were charged into a high-speed mixer and sufficiently and homogeneously stirred, and then the mixed mass was melt blended through a twin-screw extruder, with the extruder temperature being 190° C. to 220° C. (the temperatures of the various zones: 190° C., 210° C., 220° C., 220° C., 215° C., and 210° C.) and the rotating speed being 350 r.p.m., and extruded and pelletized. The obtained pellets were dried in a thermostatic oven at 90° C. for 3 hrs, and then, injection molded at an injection molding temperature of 200 to 220° C. into standard splines of specified size for flame-retardant, antibacterial and mechanical property tests.

Example 10

100 parts by weight of polypropylene, 0.9 parts by weight of the polymer microspheres #3, 0.25 parts by weight of aluminum hypophosphite, 0.2 parts by weight of MHB, 0.1 parts by weight of DMDPB, 0.2 parts by weight of zinc pyrithione and 0.25 parts by weight of the compounded antioxidant were charged into a high-speed mixer and sufficiently and homogeneously stirred, and then the mixed mass was melt blended through a twin-screw extruder, with the extruder temperature being 190° C. to 220° C. (the temperatures of the various zones: 190° C., 210° C., 220° C., 220° C., 215° C., and 210° C.) and the rotating speed being 350 r.p.m., and extruded and pelletized. The obtained pellets were dried in a thermostatic oven at 90° C. for 3 hrs, and then, injection molded at an injection molding temperature of 200 to 220° C. into standard splines of specified size for flame-retardant, antibacterial and mechanical property tests.

Example 11

100 parts by weight of polypropylene, 1.6 parts by weight of the polymer microspheres #4, 0.1 parts by weight of DMDPB, 0.2 parts by weight of zinc pyrithione and 0.25 parts by weight of the compounded antioxidant were charged into a high-speed mixer and sufficiently and homogeneously stirred, and then the mixed mass was melt blended through a twin-screw extruder, with the extruder temperature being 190° C. to 220° C. (the temperatures of the various zones: 190° C., 210° C., 220° C., 220° C., 215° C., and 210° C.) and the rotating speed being 350 r.p.m., and extruded and pelletized. The obtained pellets were dried in a thermostatic oven at 90° C. for 3 hrs, and then, injection molded at an injection molding temperature of 200 to 220° C. into standard splines of specified size for flame-retardant, antibacterial and mechanical property tests.

Comparative Example 3

100 parts by weight of polypropylene, 1.6 parts by weight of the silver-supporting zeolite antibacterial agent, 0.1 parts by weight of DMDPB, 0.2 parts by weight of zinc pyrithione and 0.25 parts by weight of the compounded antioxidant were charged into a high-speed mixer and sufficiently and homogeneously stirred, and then the mixed mass was melt blended through a twin-screw extruder, with the extruder temperature being 190° C. to 220° C. (the temperatures of the various zones: 190° C., 210° C., 220° C., 220° C., 215° C., and 210° C.) and the rotating speed being 350 r.p.m., and extruded and pelletized. The obtained pellets were dried in a thermostatic oven at 90° C. for 3 hrs, and then, injection molded at an injection molding temperature of 200 to 220° C. into standard splines of specified size for flame-retardant, antibacterial and mechanical property tests.

Example 12

100 parts by weight of polypropylene, 1.0 parts by weight of the polymer microspheres #5, 0.25 parts by weight of aluminum hypophosphite, 0.3 parts by weight of MHB, 0.1 parts by weight of DMDPB, 0.2 parts by weight of zinc pyrithione and 0.25 parts by weight of the compounded antioxidant were charged into a high-speed mixer and sufficiently and homogeneously stirred, and then the mixed mass was melt blended through a twin-screw extruder, with the extruder temperature being 190° C. to 220° C. (the temperatures of the various zones: 190° C., 210° C., 220° C., 220° C., 215° C., and 210° C.) and the rotating speed being 350 r.p.m., and extruded and pelletized. The obtained pellets were dried in a thermostatic oven at 90° C. for 3 hrs, and then, injection molded at an injection molding temperature of 200 to 220° C. into standard splines of specified size for flame-retardant, antibacterial and mechanical property tests.

Example 13

100 parts by weight of polypropylene, 1.0 parts by weight of the polymer microspheres #6, 0.25 parts by weight of aluminum hypophosphite, 0.3 parts by weight of MHB, 0.1 parts by weight of DMDPB, 0.2 parts by weight of zinc pyrithione and 0.25 parts by weight of the compounded antioxidant were charged into a high-speed mixer and sufficiently and homogeneously stirred, and then the mixed mass was melt blended through a twin-screw extruder, with the extruder temperature being 190° C. to 220° C. (the temperatures of the various zones: 190° C., 210° C., 220° C., 220° C., 215° C., and 210° C.) and the rotating speed being 350 r.p.m., and extruded and pelletized. The obtained pellets were dried in a thermostatic oven at 90° C. for 3 hrs, and then, injection molded at an injection molding temperature of 200 to 220° C. into standard splines for flame-retardant, antibacterial and mechanical property tests.

Example 14

100 parts by weight of polypropylene, 1.2 parts by weight of the polymer microspheres #7, 0.2 parts by weight of aluminum hypophosphite, 0.3 parts by weight of MHB, 0.1 parts by weight of DMDPB, 0.2 parts by weight of zinc pyrithione and 0.25 parts by weight of the compounded antioxidant were charged into a high-speed mixer and sufficiently and homogeneously stirred, and then the mixed mass was melt blended through a twin-screw extruder, with the extruder temperature being 190° C. to 220° C. (the temperatures of the various zones being: 190° C., 210° C., 220° C., 220° C., 215° C., and 210° C.) and the rotating speed being 350 r.p.m., and extruded and pelletized. The obtained pellets were dried in a thermostatic oven at 90° C. for 3 hrs, and then, injection molded at an injection molding temperature of 200 to 220° C. into standard splines for flame-retardant, antibacterial and mechanical property tests.

Example 15

100 parts by weight of polyethylene, 2 parts by weight of the polymer microspheres #1, 0.2 parts by weight of zinc pyrithione and 0.25 parts by weight of the compounded antioxidant were charged into a high-speed mixer and sufficiently and homogeneously stirred, and then the mixed mass was melt blended through a twin-screw extruder, with the extruder temperature being 175° C. to 205° C. (175° C., 190° C., 205° C., 205° C., 200° C., and 195° C.) and the rotating speed being 350 r.p.m., and extruded and pelletized. The obtained pellets were dried in a thermostatic oven at 90° C. for 3 hrs, and then, injection molded at an injection molding temperature of 190 to 200° C. into samples for flame-retardant and antibacterial tests.

Comparative Example 4

100 parts by weight of polyethylene and 0.25 parts by weight of the compounded antioxidant were charged into a high-speed mixer and sufficiently and homogeneously stirred, and then the mixed mass was melt blended through a twin-screw extruder, with the extruder temperature being 175° C. to 205° C. (175° C., 190° C., 205° C., 205° C., 200° C., and 195° C.) and the rotating speed being 350 r.p.m., and extruded and pelletized. The obtained pellets were dried in a thermostatic oven at 90° C. for 3 hrs, and then, injection molded at an injection molding temperature of 190 to 200° C., into samples for flame-retardant and antibacterial tests.

Example 16

100 parts by weight of nylon 6, 2.5 parts by weight of the polymer microspheres #2, 0.3 parts by weight of zinc pyrithione and 0.3 parts by weight of the compounded antioxidant were charged into a high-speed mixer and sufficiently and homogeneously stirred, and then the mixed mass was melt blended through a twin-screw extruder, with the extruder temperature being 220° C. to 240° C. (220° C., 230° C., 240° C., 240° C., 240° C., and 240° C.) and the rotating speed being 350 r.p.m., and extruded and pelletized. The obtained pellets were dried in a thermostatic oven at 90° C. for 3 hrs, and then, injection molded at an injection molding temperature of 230 to 240° C. into samples for flame-retardant and antibacterial tests.

Comparative Example 5

100 parts by weight of nylon 6 and 0.3 parts by weight of the compounded antioxidant were charged into a high-speed mixer and sufficiently and homogeneously stirred, and then the mixed mass was melt blended through a twin-screw extruder, with the extruder temperature being 220° C. to 240° C. (the temperatures of the various zones: 220° C., 230° C., 240° C., 240° C., 240° C., and 240° C.) and the rotating speed being 350 r.p.m., and extruded and pelletized. The extruded pellets were dried in a thermostatic oven at 90° C. for 3 hrs, and then, injection molded at an injection molding temperature of 230 to 240° C. into samples for flame-retardant and antibacterial tests.

Example 17

80 parts by weight of PC, 20 parts by weight of ABS, 4 parts by weight of the polymer microspheres #4, 0.3 parts by weight of zinc pyrithione and 0.3 parts by weight of the compounded antioxidant were charged into a high-speed mixer and sufficiently and homogeneously stirred, and then the mixed mass was melt blended through a twin-screw extruder, with the extruder temperature being 230° C. to 260° C. (the temperatures of the various zones: 230° C., 240° C., 255° C., 260° C., 255° C., and 240° C.) and the rotating speed being 350 r.p.m., and extruded and pelletized. The obtained pellets were dried in a thermostatic oven at 90° C. for 3 hrs, and then, injection molded at an injection molding temperature of 230 to 240° C. into samples for flame-retardant and antibacterial tests.

Comparative Example 6

80 parts by weight of PC, 20 parts by weight of ABS and 0.3 parts by weight of the compounded antioxidant were charged into a high-speed mixer and sufficiently and homogeneously stirred, and then the mixed mass was melt blended through a twin-screw extruder, with the extruder temperature being 230° C. to 260° C. (the temperatures of the various zones: 230° C., 240° C., 255° C., 260° C., 255°

C., and 240° C.) and the rotating speed being 350 r.p.m., and extruded and pelletized. The obtained pellets were dried in a thermostatic oven at 90° C. for 3 hrs, and then, injection molded at an injection molding temperature of 230 to 240° C. into samples for flame-retardant and antibacterial tests.

Example 18

100 parts by weight of polypropylene, 1.6 parts by weight of the polymer microspheres #4 and 0.25 parts by weight of the compounded antioxidant were charged into a high-speed mixer and sufficiently and homogeneously stirred, and then the mixed mass was melt blended through a twin-screw extruder, with the temperatures of the various zones of the extruder being: 190° C., 210° C., 220° C., 220° C., 215° C., and 210° C. and the rotating speed being 350 r.p.m., and extruded and pelletized. The obtained pellets were dried in a thermostatic oven at 90° C. for 3 hrs, and then, injection molded at an injection molding temperature of 200 to 220° C. into standard splines of specified size for flame-retardant and antibacterial tests.

Example 19

100 parts by weight of polypropylene, 5 parts by weight of the polymer microspheres #4 and 0.25 parts by weight of the compounded antioxidant were charged into a high-speed mixer and sufficiently and homogeneously stirred, and then the mixed mass was melt blended through a twin-screw extruder, with the temperatures of the various zones of the extruder being: 190° C., 210° C., 220° C., 220° C., 215° C., and 210° C. and the rotating speed being 350 r.p.m., and extruded and pelletized. The obtained pellets were dried in a thermostatic oven at 90° C. for 3 hrs, and then, injection molded at an injection molding temperature of 200 to 220° C. into standard splines of specified size for flame-retardant and antibacterial tests.

Comparative Example 7

1. (1) The $C_4$ fraction from the ethylene cracking process of the Sinopec Zhenhai Refining & Chemical, China, was used. The $C_4$ fraction was a mixed butene gas having the following composition: trans-2-butene: 40.83% by weight; cis-2-butene: 18.18% by weight; n-butane: 24.29% by weight; n-butene: 9.52% by weight; isobutene: 2.78% by weight; and others: 4.4% by weight. In an autoclave, 100 g of maleic anhydride and 2 g of azobisisobutyronitrile were dissolved in 800 mL of isoamyl acetate to form solution 1, and the well metered mixed butenes (wherein the molar ratio of maleic anhydride to the effective component (terminal olefins) in the mixed olefins was 1:1) were passed thereinto for reaction at 70° C. and 0.5 MPa for 1 hour under a nitrogen atmosphere.

(2) 25 g of divinylbenzene was dissolved in 200 mL of isoamyl acetate to prepare solution 2. Solution 2 was added dropwise to the reaction system obtained in (1) by a plunger pump for 2 hours. After the completion of the dropwise addition, the reaction system continued to react for 3 hours while maintaining the temperature.

(3) After the above reaction, the autoclave was decompressed, and the system was left to stand for layering, the heavy phase was centrifuged by a centrifuge at 5000 rad/min for 20 minutes, the obtained solid was dried under vacuum to obtain the polymer microspheres #8 which was not grafted with guanidine salt on the surface. The average particle diameter of the obtained polymer microspheres was 1200 nm. The weight percentage of the dissolving-out substances from the obtained polymer microspheres in acetone of 5 times the weight thereof at 50° C. for 30 min was 5.5%, and correspondingly, the crosslinking degree was 94.5%.

2. 100 parts by weight of polypropylene, 5 parts by weight of the polymer microspheres #8 and 0.25 parts by weight of the compounded antioxidant were charged into a high-speed mixer and sufficiently and homogeneously stirred, and then the mixed mass was melt blended through a twin-screw extruder, with the temperatures of the various zones of the extruder being: 190° C., 210° C., 220° C., 220° C., 215° C., and 210° C. and the rotating speed being 350 r.p.m., and extruded and pelletized. The obtained pellets were dried in a thermostatic oven at 90° C. for 3 hrs, and then, injection molded at an injection molding temperature of 200 to 220° C. into standard splines of specified size for flame-retardant and antibacterial tests.

Example 20

100 parts by weight of polypropylene, 1 part by weight of the polymer microspheres #4, 0.2 parts by weight of aluminum hypophosphite, 0.1 parts by weight of DMDPB and 0.25 parts by weight of the compounded antioxidant were charged into a high-speed mixer and sufficiently and homogeneously stirred, and then the mixed mass was melt blended through a twin-screw extruder, with the temperatures of the various zones of the extruder being: 190° C., 210° C., 220° C., 220° C., 215° C., and 210° C. and the rotating speed being 350 r.p.m., and extruded and pelletized. The obtained pellets were dried in a thermostatic oven at 90° C. for 3 hrs, and then, injection molded at an injection molding temperature of 200 to 220° C. into standard splines of specified size for flame-retardant and antibacterial tests.

Example 21

100 parts by weight of polypropylene, 1 part by weight of the polymer microspheres #4, 0.2 parts by weight of aluminum hypophosphite, 0.1 parts by weight of DMDPB, 0.2 parts by weight of zinc pyrithione and 0.25 parts by weight of the compounded antioxidant were charged into a high-speed mixer and sufficiently and homogeneously stirred, and then the mixed mass was melt blended through a twin-screw extruder, with the temperatures of the various zones of the extruder being: 190° C., 210° C., 220° C., 220° C., 215° C., and 210° C. and the rotating speed being 350 r.p.m., and extruded and pelletized. The obtained pellets were dried in a thermostatic oven at 90° C. for 3 hrs, and then, injection molded at an injection molding temperature of 200 to 220° C. into standard splines of specified size for flame-retardant and antibacterial tests.

Example 22

100 parts by weight of polypropylene, 1 part by weight of the polymer microspheres #4, 0.2 parts by weight of MHB, 0.1 parts by weight of DMDPB and 0.25 parts by weight of the compounded antioxidant were charged into a high-speed mixer and sufficiently and homogeneously stirred, and then the mixed mass was melt blended through a twin-screw extruder, with the temperatures of the various zones of the extruder being: 190° C., 210° C., 220° C., 220° C., 215° C., and 210° C. and the rotating speed being 350 r.p.m., and extruded and pelletized. The obtained pellets were dried in a thermostatic oven at 90° C. for 3 hrs, and then, injection molded at an injection molding temperature of 200 to 220° C. into standard splines of specified size for flame-retardant and antibacterial tests.

Example 23

100 parts by weight of polypropylene, 1.6 parts by weight of the polymer microspheres #4, 0.2 parts by weight of aluminum hypophosphite, 0.1 parts by weight of DMDPB and 0.25 parts by weight of the compounded antioxidant were charged into a high-speed mixer and sufficiently and homogeneously stirred, and then the mixed mass was melt blended through a twin-screw extruder, with the temperatures of the various zones of the extruder being: 190° C., 210° C., 220° C., 220° C., 215° C., and 210° C. and the rotating speed being 350 r.p.m., and extruded and pelletized. The obtained pellets were dried in a thermostatic oven at 90° C. for 3 hrs, and then, injection molded at an injection molding temperature of 200 to 220° C. into standard splines of specified size for flame-retardant and antibacterial tests.

Example 24

100 parts by weight of polypropylene, 1.8 parts by weight of the polymer microspheres #4, 0.1 parts by weight of DMDPB and 0.25 parts by weight of the compounded antioxidant were charged into a high-speed mixer and sufficiently and homogeneously stirred, and then the mixed mass was melt blended through a twin-screw extruder, with the temperatures of the various zones of the extruder being: 190° C., 210° C., 220° C., 220° C., 215° C., and 210° C. and the rotating speed being 350 r.p.m., and extruded and pelletized. The obtained pellets were dried in a thermostatic oven at 90° C. for 3 hrs, and then, injection molded at an injection molding temperature of 200 to 220° C. into standard splines of specified size for flame-retardant and antibacterial tests.

Comparative Example 8

100 parts by weight of polypropylene, 1.8 parts by weight of aluminum hypophosphite, 0.1 parts by weight of DMDPB and 0.25 parts by weight of the compounded antioxidant were charged into a high-speed mixer and sufficiently and homogeneously stirred, and then the mixed mass was melt blended through a twin-screw extruder, with the temperatures of the various zones of the extruder being: 190° C., 210° C., 220° C., 220° C., 215° C., and 210° C. and the rotating speed being 350 r.p.m., and extruded and pelletized. The obtained pellets were dried in a thermostatic oven at 90° C. for 3 hrs, and then, injection molded at an injection molding temperature of 200 to 220° C. into standard splines of specified size for flame-retardant and antibacterial tests.

Example 25

100 parts by weight of polypropylene, 1 part by weight of the polymer microspheres #4, 0.1 parts by weight of aluminum hypophosphite, 0.1 parts by weight of MHB, 0.1 parts by weight of DMDPB and 0.25 parts by weight of the compounded antioxidant were charged into a high-speed mixer and sufficiently and homogeneously stirred, and then the mixed mass was melt blended through a twin-screw extruder, with the temperatures of the various zones of the extruder being: 190° C., 210° C., 220° C., 220° C., 215° C., and 210° C. and the rotating speed being 350 r.p.m., and extruded and pelletized. The obtained pellets were dried in a thermostatic oven at 90° C. for 3 hrs, and then, injection molded at an injection molding temperature of 200 to 220° C. into standard splines of specified size for flame-retardant and antibacterial tests.

Comparative Example 9

100 parts by weight of polypropylene, 1.8 parts by weight of MHB, 0.1 parts by weight of DMDPB and 0.25 parts by weight of the compounded antioxidant were charged into a high-speed mixer and sufficiently and homogeneously stirred, and then the mixed mass was melt blended through a twin-screw extruder, with the temperatures of the various zones of the extruder being: 190° C., 210° C., 220° C., 220° C., 215° C., and 210° C. and the rotating speed being 350 r.p.m., and extruded and pelletized. The obtained pellets were dried in a thermostatic oven at 90° C. for 3 hrs, and then, injection molded at an injection molding temperature of 200 to 220° C. into standard splines of specified size for flame-retardant and antibacterial tests.

Example 26

100 parts by weight of polypropylene, 1.6 parts by weight of the polymer microspheres #4, 0.2 parts by weight of MHB, 0.1 parts by weight of DMDPB and 0.25 parts by weight of the compounded antioxidant were charged into a high-speed mixer and sufficiently and homogeneously stirred, and then the mixed mass was melt blended through a twin-screw extruder, with the temperatures of the various zones of the extruder being: 190° C., 210° C., 220° C., 220° C., 215° C., and 210° C. and the rotating speed being 350 r.p.m., and extruded and pelletized. The obtained pellets were dried in a thermostatic oven at 90° C. for 3 hrs, and then, injection molded at an injection molding temperature of 200 to 220° C. into standard splines of specified size for flame-retardant and antibacterial tests.

Comparative Example 10

100 parts by weight of polypropylene, 0.2 parts by weight of aluminum hypophosphite, 0.35 parts by weight of MHB, 0.1 parts by weight of the flame-retardant synergist DMDPB and 0.25 parts by weight of the compounded antioxidant were charged into a high-speed mixer and sufficiently and homogeneously stirred, and then the mixed mass was melt blended through a twin-screw extruder, with the extruder temperature being 190° C. to 220° C. (the temperatures of the various zones being: 190° C., 210° C., 220° C., 220° C., 215° C., and 210° C.) and the rotating speed being 350 r.p.m., and extruded and pelletized. The obtained pellets were dried in a thermostatic oven at 90° C. for 3 hrs, and then, injection molded at an injection molding temperature of 200 to 220° C. into standard splines of specified size for flame-retardant, antibacterial and mechanical property tests.

TABLE 1

Formulations of compositions of Examples and Comparative Examples

| Items | Matrix resin Type | Amount | Antibacterial agent Type | Amount | Flame retardant Type | Amount | Flame-retardant synergist Type | Amount | Anti-mildew agent Type | Amount |
|---|---|---|---|---|---|---|---|---|---|---|
| Example 8 | PP | 100 | Microspheres #1 | 1 | Aluminum hypophosphite MHB | 0.2 0.35 | DMDPB | 0.1 | Zinc pyrithione | 0.2 |
| Example 9 | PP | 100 | Microspheres #2 | 1 | Aluminum hypophosphite MHB | 0.2 0.35 | DMDPB | 0.1 | Zinc pyrithione | 0.2 |
| Example 10 | PP | 100 | Microspheres #3 | 0.9 | Aluminum hypophosphite MHB | 0.25 0.2 | DMDPB | 0.1 | Zinc pyrithione | 0.2 |
| Example 11 | PP | 100 | Microspheres #4 | 1.6 | | | DMDPB | 0.1 | Zinc pyrithione | 0.2 |
| Example 12 | PP | 100 | Microspheres #5 | 1 | Aluminum hypophosphite MHB | 0.25 0.3 | DMDPB | 0.1 | Zinc pyrithione | 0.2 |
| Example 13 | PP | 100 | Microspheres #6 | 1 | Aluminum hypophosphite MHB | 0.25 0.3 | DMDPB | 0.1 | Zinc pyrithione | 0.2 |
| Example 14 | PP | 100 | Microspheres #7 | 1.2 | Aluminum hypophosphite MHB | 0.2 0.3 | DMDPB | 0.1 | Zinc pyrithione | 0.2 |
| Comparative Example 1 | PP | 100 | — | | | | | | | |
| Comparative Example 2 | PP | 100 | Silver-supporting zeolite | 1 | Aluminum hypophosphite MHB | 0.2 0.35 | DMDPB | 0.1 | Zinc pyrithione | 0.2 |
| Comparative Example 3 | PP | 100 | Silver-supporting zeolite | 1.6 | | | DMDPB | 0.1 | Zinc pyrithione | 0.2 |
| Example 15 | PE | 100 | Microspheres #1 | 2 | | | | | Zinc pyrithione | 0.2 |
| Comparative Example 4 | PE | 100 | | | | | | | | |
| Example 16 | PA | 100 | Microspheres #2 | 2.5 | | | | | Zinc pyrithione | 0.3 |
| Comparative Example 5 | PA | 100 | | | | | | | | |
| Example 17 | PC ABS | 80 20 | Microspheres #4 | 4 | | | | | Zinc pyrithione | 0.3 |
| Comparative Example 6 | PC ABS | 80 20 | | | | | | | | |
| Example 18 | PP | 100 | Microspheres #4 | 1.6 | | | | | | |
| Example 19 | PP | 100 | Microspheres #4 | 5 | | | | | | |
| Comparative Example 7 | PP | 100 | #8(blank microspheres) | 5 | | | | | | |
| Example 20 | PP | 100 | Microspheres #4 | 1 | Aluminum hypophosphite | 0.2 | DMDPB | 0.1 | | |
| Example 21 | PP | 100 | Microspheres #4 | 1 | Aluminum hypophosphite | 0.2 | DMDPB | 0.1 | Zinc pyrithione | 0.2 |
| Example 22 | PP | 100 | Microspheres #4 | 1 | MHB | 0.2 | DMDPB | 0.1 | | |
| Example 23 | PP | 100 | Microspheres #4 | 1.6 | Aluminum hypophosphite | 0.2 | DMDPB | 0.1 | | |
| Example 24 | PP | 100 | Microspheres #4 | 1.8 | | | DMDPB | 0.1 | | |
| Comparative Example 8 | PP | 100 | | | Aluminum hypophosphite | 1.8 | DMDPB | 0.1 | | |
| Example 25 | PP | 100 | Microspheres #4 | 1 | Aluminum hypophosphite MHB | 0.1 0.1 | DMDPB | 0.1 | | |
| Comparative Example 9 | PP | 100 | | | MHB | 1.8 | DMDPB | 0.1 | | |
| Example 26 | PP | 100 | Microspheres #4 | 1.6 | MHB | 0.2 | DMDPB | 0.1 | | |
| Comparative Example 10 | PP | 100 | | | Aluminum hypophosphite MHB | 0.2 0.35 | DMDPB | 0.1 | | |

TABLE 2

Comparison of properties of compositions of Examples and Comparative Examples

| Items | Tensile strength/ MPa | Flexural modulus/ GPa | Antibacterial test *Escherichia coli* | Antibacterial test *Staphylococcus aureus* | Vertical Burn UL-94 | Limit oxygen index/% (LOI value) | Glow wire flammability index 750° C. |
|---|---|---|---|---|---|---|---|
| Example 8 | 34.6 | 1.54 | 99.9% | 99.9% | V-2 | 24.0 | Passed |
| Example 9 | 35.1 | 1.52 | 99.9% | 99.9% | V-2 | 23.8 | Passed |
| Example 10 | 34.7 | 1.55 | 99.9% | 99.9% | V-2 | 24.5 | Passed |
| Example 11 | 34.9 | 1.49 | 99.9% | 99.9% | V-2 | 24.2 | Passed |
| Example 12 | 33.9 | 1.52 | 99.9% | 99.9% | V-2 | 23.7 | Passed |
| Example 13 | 34.1 | 1.53 | 99.9% | 99.9% | V-2 | 24.5 | Passed |
| Example 14 | 34.5 | 1.55 | 99.9% | 99.9% | V-2 | 24.3 | Passed |
| Comparative Example 1 | 34.5 | 1.43 | 0% | 0% | NR | 19.9 | Failed |
| Comparative Example 2 | 31.0 | 1.45 | 99.9% | 99.9% | NR | 22.5 | Failed |
| Comparative Example 3 | 32.9 | 1.48 | 99.9% | 99.9% | NR | 20.5 | Failed |
| Example 15 | — | | 99.9% | 99.9% | HB | 19.8 | |
| Comparative Example 4 | | | 0% | 0% | NR | 17 | |
| Example 16 | | | 99.9% | 99.9% | V-2 | 26.8 | |
| Comparative Example 5 | | | 0% | 0% | V-2 | 24 | |
| Example 17 | | | 99.9% | 99.9% | V-2 | 25.6 | |
| Comparative Example 6 | | | 0% | 0% | NR | 24 | |
| Example 18 | | | 99.9% | 99.9% | HB | 23 | |
| Example 19 | | | 99.9% | 99.9% | V2 | 24 | |
| Comparative Example 7 | | | 0% | 0% | NR | 19.5 | |
| Example 20 | | | 99.9% | 99.9% | V-2 | 22.5 | |
| Example 21 | | | 99.9% | 99.9% | V-2 | 22.0 | |
| Example 22 | | | 99.9% | 99.9% | V-2 | 22.5 | |
| Example 23 | | | 99.9% | 99.9% | V-2 | 25.5 | |
| Example 24 | | | 99.9% | 99.9% | HB | 23.5 | |
| Comparative Example 8 | | | 0% | 0% | HB | 24 | |
| Example 25 | | | 99.9% | 99.9% | V-2 | 24 | |
| Comparative Example 9 | | | 0% | 0% | HB | 23.5 | |
| Example 26 | | | 99.9% | 99.9% | V-2 | 25 | |
| Comparative Example 10 | 34.6 | 1.44 | 0% | 0% | HB | 23 | Failed | in Table 2 means undetermined.

It can be seen from the test results in Table 1 and Table 2 that PP resin itself is very easy to burn and does not have antibacterial property.

Examples 8 to 14 and 18 to 26 are the flame-retardant antibacterial PP compositions according to the present invention using the flame-retardant antibacterial microspheres of the present invention. It can be seen from Table 2 that the PP compositions according to the present invention have not only an excellent antibacterial property, but also can reach the HB level or even V-2 level of the UL-94 test with a low addition amount of the flame retardant, showing a good self-extinguishing property. In Examples 8-14, the compositions are tested to have passed the glow wire flammability index test at 750° C.

It can also be seen from the test results of Examples 8-14 that the PP compositions according to the present invention not only have flame-retardant and antibacterial properties, but also have improved tensile strength and/or flexural modulus compared with PP alone (Comparative Example 1), and have overcome the technical difficulty in the prior art regarding reduced comprehensive performance of materials due to the poor dispersibility of the flame retardant and the antibacterial agent in the matrix.

From comparison of Example 11 with Comparative Example 3, Example 24 with Comparative Examples 8 and 9, and Example 8 with Comparative Example 2, it can be seen that under the same addition amount of flame-retardant and antibacterial additives, the compositions using the flame-retardant antibacterial microspheres of the present invention have more excellent flame-retardant and antibacterial comprehensive performance than the compositions using the antibacterial agent alone, the flame retardant alone or the combination of the flame retardant and the antibacterial agent in the prior art.

From comparison of Example 23, Example 24 and Comparative Example 8, or comparison of Example 24, Example 26 and Comparative Example 9, it can be seen that when the flame-retardant antibacterial microspheres according to the present invention are used in combination with the aluminum hypophosphite-based flame retardant or halogen-containing flame retardant, a synergistic effect is produced through the establishment of a hybrid carbon layer structure, and the obtained flame-retardant and antibacterial properties are remarkably better than the use of a single component in the same addition amount.

From comparison of Examples 20, 22 and 25, it can be seen that in the case of adding aluminum hypophosphite-based flame retardant and halogen-containing flame retardant simultaneously, a better synergistic flame-retardant effect is obtained compared with adding aluminum hypophosphite-based flame retardant or halogen-containing flame retardant separately.

From comparison of the results of Examples 18, 19 and 11, it can be seen that in the case of adding a flame-retardant synergist and an anti-mildew agent, the flame-retardant and antibacterial efficiencies of the flame-retardant antibacterial microspheres of the present invention can be increased, so that a higher flame-retardant level can be reached with a lower addition amount.

From comparison of Examples 15-17 and Comparative Examples 4-6, it can be seen that the flame-retardant antibacterial microspheres of the present invention also improve the flame-retardant and antibacterial properties of materials in other matrix resins, such as PE, PA and PC/ABS.

From comparison of Comparative Example 2 and Comparative Example 10, it can be seen that the addition of the existing silver antibacterial agent decreases both the flame retardancy and the tensile strength of the resin composition added with a flame retardant.

To sum up, the single-component flame-retardant antibacterial microspheres of the present invention not only have high flame-retardant and antibacterial efficiencies, but also can achieve a synergistic effect with the flame retardants in the prior art, and further have a good dispersibility in the matrix, thereby overcoming the technical difficulty in the prior art regarding decreased comprehensive performance of materials due to the poor dispersibility of the flame retardant and the antibacterial agent in the matrix.

While the present invention has been described in detail and illustrated by way of examples, other modifications and changes within the spirit and scope of the present invention will be apparent to a person skilled in the art. Furthermore, it is to be understood that various aspects, various parts of different embodiments, and various features listed in the present invention may be combined or replaced in whole or in part. In addition, a person skilled in the art will appreciate that the above description is by way of example only and is not intended to limit the present invention.

The invention claimed is:

1. A flame-retardant antibacterial agent, comprising a polymer microsphere having a guanidine salt grafted on a surface thereof,
wherein the polymer microsphere comprises a crosslinked structure constituted by a structural unit A derived from maleic anhydride, a structural unit B derived from a monomer M, and a structural unit C derived from a crosslinking agent, wherein the monomer M is selected from the group consisting of $C_4$-$C_9$ aliphatic olefins and mixtures thereof; and
the guanidine salt comprises at least one flame-retardant guanidine salt.

2. The flame-retardant antibacterial agent according to claim 1, wherein the guanidine salt-grafted polymer microsphere has an average particle diameter in the range of 200-2000 nm.

3. The flame-retardant antibacterial agent according to claim 1, wherein the polymer microsphere as the graft base comprises a crosslinked alternating copolymer structure formed from maleic anhydride, a monomer M and a crosslinking agent.

4. The flame-retardant antibacterial agent according to claim 1, wherein
the guanidine salt-grafted polymer microsphere has a shell crosslinked structure, and/or
the crosslinking degree of the guanidine salt-grafted polymer microsphere is $\geq 50\%$, as determined by a solvent extraction method.

5. The flame-retardant antibacterial agent according to claim 1, wherein a molar ratio of the structural unit A to the structural unit B ranges from (0.5:1) to (1:0.5).

6. The flame-retardant antibacterial agent according to claim 1, wherein the monomer M is chosen from $C_4$-aliphatic monoolefin, $C_4$-aliphatic diolefin, $C_5$-aliphatic monoolefin, $C_5$-aliphatic diolefin, a mixture of isomers thereof, or a mixture of the monoolefins and the diolefins.

7. The flame-retardant antibacterial agent according to claim 1, wherein the crosslinking agent is selected from the group consisting of di-functional and higher-functional vinyl-containing monomers capable of free radical polymerization; wherein the crosslinking agent is at least one selected from the group consisting of divinylbenzene and acrylate-based crosslinking agents containing at least two acrylate-based groups; and wherein the acrylate-based group has the structural formula: $-O-C(O)-C(R')=CH_2$, wherein R' is H or a $C_1$-$C_4$ alkyl group.

8. The flame-retardant antibacterial agent according to claim 1, wherein the guanidine salt is one or more selected from the group consisting of small molecule guanidine salts and guanidine salt polymers.

9. The flame-retardant antibacterial agent according to claim 1, wherein the flame-retardant guanidine salt contains a flame-retardant element, and contains phosphorus atom, halogen atom and/or nitrogen atom other than the nitrogen atom of the guanidine group.

10. The flame-retardant antibacterial agent according to claim 1, wherein the proportion of the flame-retardant guanidine salt is 30-100 wt %, based on the total weight of all the guanidine salts.

11. A method for the preparation of the flame-retardant antibacterial agent according to claim 1, comprising:
subjecting maleic anhydride, the monomer M and the crosslinking agent to crosslinking copolymerization reaction in the presence of an initiator to prepare polymer microspheres, and
contacting the polymer microspheres with the guanidine salt to graft the guanidine salt onto the polymer microspheres, thereby obtaining the flame-retardant antibacterial agent.

12. The method according to claim 11, wherein the polymer microspheres as the graft base are prepared by a self-stabilizing precipitation polymerization method.

13. The method according to claim 11, comprising:
S1: reacting maleic anhydride and a first portion of the monomer M in the presence of a first portion of an initiator for a partial reaction in an organic solvent;
S2: adding a feed comprising a crosslinking agent into the mixture from S1 for further reaction, wherein the feed optionally further comprises a second portion of the monomer M, a second portion of the initiator, or a solvent; and
S3: adding the guanidine salt to a product obtained from S2 to graft the guanidine salt the surface of the product obtained in from S2.

14. The method according to claim 13, wherein the organic solvent is selected from the group consisting of organic acid alkyl esters, mixtures of organic acid alkyl esters and alkanes, and mixtures of organic acid alkyl esters and aromatic hydrocarbons;
wherein the organic acid alkyl ester is at least one selected from the group consisting of methyl formate, ethyl formate, propyl formate, butyl formate, isobutyl formate, amyl formate, methyl acetate, ethyl acetate, propyl acetate, butyl acetate, isobutyl acetate, sec-butyl acetate, amyl acetate, isoamyl acetate, benzyl acetate, methyl propionate, ethyl propionate, butyl propionate, methyl butyrate, ethyl butyrate, butyl butyrate, isobutyl butyrate, isoamyl butyrate, isoamyl isovalerate, methyl benzoate, ethyl benzoate, propyl benzoate, butyl benzoate, isoamyl benzoate, methyl phenylacetate, and ethyl phenylacetate.

15. The method according to claim 13, wherein:
relative to 100 mol of maleic anhydride, a total amount of the first portion of the monomer M and the optional second portion of the monomer M in terms of terminal olefins is 50-150 mol, and a molar ratio of the optional second portion of the monomer M to the first portion of the monomer M is (0-100): 100; and/or
relative to 100 mol of maleic anhydride, an amount of the crosslinking agent is 1-40 mol; and/or
relative to 100 mol of maleic anhydride, a total amount of the first portion of the initiator and the optional second portion of the initiator is 0.05-10 mol, and a molar ratio of the optional second portion of the initiator to the first portion of the initiator is (0-100): 100.

16. The method according to claim 13, wherein the initiator is at least one selected from the group consisting of dibenzoyl peroxide, dicumyl peroxide, di-tert-butyl peroxide, dodecanoyl peroxide, tert-butyl peroxybenzoate, diisopropyl peroxydicarbonate, dicyclohexyl peroxydicarbonate, azobisisobutyronitrile, and azobisisoheptanenitrile.

17. The method according to claim 13, wherein:
S1 is carried out under an inert atmosphere at a temperature of 50 to 90° C. and a pressure of 0.3 to 1 MPa; and/or
S2 is carried out at a temperature of 50 to 90° C. and a pressure of 0.3 to 1 MPa.

18. The method according to claim 13, wherein
S3 is carried out at a temperature of 0 to 100° C.; and/or
S3, relative to 1000 g of maleic anhydride, the guanidine salt is used in an amount of 5 g to 5000 g; and/or
in S3, the product obtained S2, in a suspension or in a dried form, reacts with the solution of the guanidine salt.

19. A flame-retardant antibacterial thermoplastic resin composition, comprising a thermoplastic resin as the matrix, and a flame-retardant antibacterial agent according to claim 1, wherein, based on 100 parts by weight of the thermoplastic resin, the flame-retardant antibacterial agent is used in an amount of 0.05 to 4.0 parts by weight.

20. The flame-retardant antibacterial thermoplastic resin composition according to claim 19, further comprising an aluminum hypophosphite-based flame retardant and/or a halogen-containing flame retardant.

21. The flame-retardant antibacterial thermoplastic resin composition according to claim 19, further comprising a flame-retardant synergist and/or an anti-mildew agent.

22. The flame-retardant antibacterial thermoplastic resin composition according to claim 19, wherein the thermoplastic resin is selected from the group consisting of polyolefins, polystyrene, polyvinyl chloride, acrylonitrile-butadiene-styrene copolymer, acrylonitrile-styrene copolymer, polyoxymethylene, nylon, polyethylene terephthalate, polybutylene terephthalate, polymethyl methacrylate, polycarbonate, polyphenylene oxide, polyphenylene sulfide, polymer alloys, and mixtures thereof.

23. The flame-retardant antibacterial thermoplastic resin composition according to claim 19, wherein the composition further comprises at least one functional additive selected from the group consisting of antioxidants, light stabilizers, toughening agents, compatibilizers, pigments, and dispersants.

24. An article, prepared from the flame-retardant antibacterial thermoplastic resin composition according to claim 19, in the form of fibers, films, or fabrics.

25. The flame-retardant antibacterial agent according to claim 4, wherein the crosslinking degree of the guanidine salt-grafted polymer microsphere is ≥92%, as determined by a solvent extraction method.

26. The flame-retardant antibacterial agent according to claim 6, wherein the monomer M is the $C_4$ fraction and/or the $C_5$ fraction obtained from ethylene cracking process.

27. The flame-retardant antibacterial agent according to claim 7, wherein the crosslinking agent is one or more selected from the group consisting of divinylbenzene, propylene glycol-based bis(meth)acrylate, ethylene glycol-based bis(meth)acrylate, trimethylolpropane tri(meth)acrylate, bis(trimethylolpropane) tetra(meth)acrylate, polyethylene glycol bis(meth)acrylate, phthalate ethylene glycol diacrylate, pentaerythritol tetra(meth)acrylate, dipentaerythritol penta(meth)acrylate, dipentaerythritol hexa(meth)acrylate, and ethoxylated multifunctional acrylate.

28. The flame-retardant antibacterial agent according to claim 8, wherein the guanidine salt comprises at least one small molecule guanidine salt and at least one guanidine salt polymer.

29. The flame-retardant antibacterial agent according to claim 8, wherein both the small molecule guanidine salt and the guanidine salt polymer are flame-retardant guanidine salts.

30. The flame-retardant antibacterial agent according to claim 8, wherein the small molecule guanidine salt is at least one selected from the group consisting of: guanidine phosphate, guanidine hydrochloride, guanidine nitrate, guanidine hydrobromide, guanidine oxalate, guanidine dihydrogen phosphate, diguanidine hydrogen phosphate, and aminoguanidine salts, and
wherein the aminoguanidine salts are inorganic acid salts and organic acid salts of monoaminoguanidine, diaminoguanidine, and triaminoguanidine and are selected from the group consisting of carbonate, nitrate, phosphate, oxalate, hydrochloride, hydrobromide, and sulfonate salts.

31. The flame-retardant antibacterial agent according to claim 8, wherein the guanidine salt polymer is at least one selected from the group consisting of polyhexamethylene (bi)guanidine hydrochloride, polyhexamethylene (bi)guanidine phosphate, polyhexamethylene (bi)guanidine acetate, polyhexamethylene (bi)guanidine oxalate, polyhexamethylene (bi)guanidine stearate, polyhexamethylene (bi)guanidine laurate, polyhexamethylene (bi)guanidine benzoate, polyhexamethylene (bi)guanidine sulfonate, and polyoxyethylene guanidine salt.

32. The flame-retardant antibacterial agent according to claim 9, wherein the flame-retardant guanidine salt is at least one selected from the group consisting of guanidine phosphate, guanidine hydrochloride, guanidine hydrobromide, guanidine dihydrogen phosphate, diguanidine hydrogen phosphate, the phosphate, hydrochloride, hydrobromide, nitrate, carbonate, oxalate, sulfonate salts of aminoguanidine, polyhexamethylene (bi)guanidine hydrochloride, and polyhexamethylene (bi)guanidine phosphate.

33. The flame-retardant antibacterial thermoplastic resin composition according to claim 20, wherein the aluminum hypophosphite-based flame retardant is selected from the group consisting of inorganic aluminum hypophosphite, aluminum alkyl phosphinates, and combinations thereof.

34. The flame-retardant antibacterial thermoplastic resin composition according to claim 20, wherein the halogen-containing flame retardant is melamine hydrohalide.

35. The flame-retardant antibacterial thermoplastic resin composition according to claim 21, wherein the flame-retardant synergist is selected from the group consisting of 2,3-dimethyl-2,3-diphenylbutane, paracumene polymer, and combinations thereof.

36. The flame-retardant antibacterial thermoplastic resin composition according to claim 21, wherein the anti-mildew agent is at least one selected from the group consisting of pyrithiones, isothiazolinones, 10,10'-oxybisphenoxarsine (OBPA), 3-iodo-2-propynyl-butyl-carbamate (IPBC), 2,4,4'-trichloro-2'-hydroxydiphenyl ether, and 2-(thiazol-4-yl) benzimidazole.

* * * * *